US012563163B2

(12) United States Patent
Tang et al.

(10) Patent No.: US 12,563,163 B2
(45) Date of Patent: Feb. 24, 2026

(54) LASER PROJECTION APPARATUS AND OPERATING METHOD THEREOF

(71) Applicant: HISENSE LASER DISPLAY CO., LTD, Shandong (CN)

(72) Inventors: Tiantian Tang, Shandong (CN); Xianrong Liu, Shandong (CN)

(73) Assignee: HISENSE LASER DISPLAY CO., LTD, Qingdao (CN)

( * ) Notice: Subject to any disclaimer, the term of this patent is extended or adjusted under 35 U.S.C. 154(b) by 446 days.

(21) Appl. No.: 18/331,843

(22) Filed: Jun. 8, 2023

(65) Prior Publication Data

US 2023/0336697 A1      Oct. 19, 2023

Related U.S. Application Data

(63) Continuation of application No. PCT/CN2021/089277, filed on Apr. 23, 2021.

(30) Foreign Application Priority Data

Dec. 15, 2020      (CN) .......................... 202011480448.X

(51) Int. Cl.
*H04N 9/31*          (2006.01)
*G06T 7/70*          (2017.01)

(52) U.S. Cl.
CPC ............. *H04N 9/3161* (2013.01); *G06T 7/70* (2017.01); *H04N 9/3179* (2013.01)

(58) Field of Classification Search
CPC ...... G09G 3/3406; G09G 3/3413; G09G 3/36; G06T 7/00; G06T 7/40; G06T 7/521;

(Continued)

(56) References Cited

U.S. PATENT DOCUMENTS 10,257,481  B2 *   4/2019  Liu ...................... H04N 9/3185
2020/0118524  A1   4/2020  Hong et al.
(Continued)

FOREIGN PATENT DOCUMENTS

CN          201716417  U      1/2011
CN          101964883  A      2/2011
(Continued)

OTHER PUBLICATIONS

International Search Report and Written Opinion dated Aug. 27, 2021 in corresponding International Application No. PCT/CN2021/089277, translated, 19 pages.
Chinese First Office Action dated Jun. 27, 2023 in corresponding Chinese Application No. 202011480448.X, translated, 19 pages.

*Primary Examiner* — Sultan Chowdhury
(74) *Attorney, Agent, or Firm* — MH2 TECHNOLOGY LAW GROUP LLP

(57)          ABSTRACT

A laser projection apparatus includes a housing, a detecting device, a projection screen, and a control assembly. The control assembly is configured to: determine a target position of a target object according to a detecting signal received by the detecting device at a first moment; if determining that the target position of the target object is within at least one threshold range, superimpose a second image on a first image on the projection screen, control the second image to show that the first image is adjusted after a target duration, and adjust at least one of the image content or the audio content corresponding to the projected image.

20 Claims, 10 Drawing Sheets

(58) Field of Classification Search
CPC .. G06T 7/55; G06T 7/70; G03B 21/00; G03B
21/145; G03B 21/147; G03B 21/208;
G03B 21/2013; G03B 21/2033; G03B
21/2053; G03B 21/2086; H04N 9/3141;
H04N 9/3155; H04N 9/3161; H04N
9/3164; H04N 9/3179; H04N 9/3182;
H04N 9/3185; H04N 9/3194
See application file for complete search history.

(56) References Cited

U.S. PATENT DOCUMENTS

| | | | | |
|---|---|---|---|---|
| 2021/0158730 | A1* | 5/2021 | Kondo | G06F 18/241 |
| 2021/0274139 | A1* | 9/2021 | Fuchikami | H04N 9/3194 |

FOREIGN PATENT DOCUMENTS

| | | |
|---|---|---|
| CN | 102300060 A | 12/2011 |
| CN | 103700229 A | 4/2014 |
| CN | 105491311 A | 4/2016 |
| CN | 107864267 A | 3/2018 |
| CN | 108600715 A | 9/2018 |
| CN | 109558008 A | 4/2019 |
| CN | 109828734 A | 5/2019 |
| CN | 111045283 A | 4/2020 |
| CN | 111818316 A | 10/2020 |
| CN | 112616046 A | 4/2021 |
| KR | 1020040055265 A | 6/2004 |
| KR | 1020200043108 A | 4/2020 |

* cited by examiner

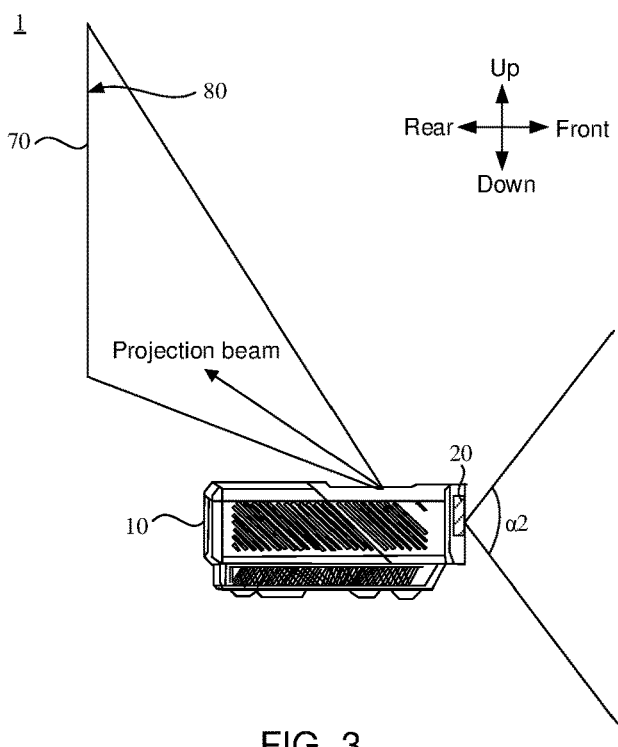
FIG. 3
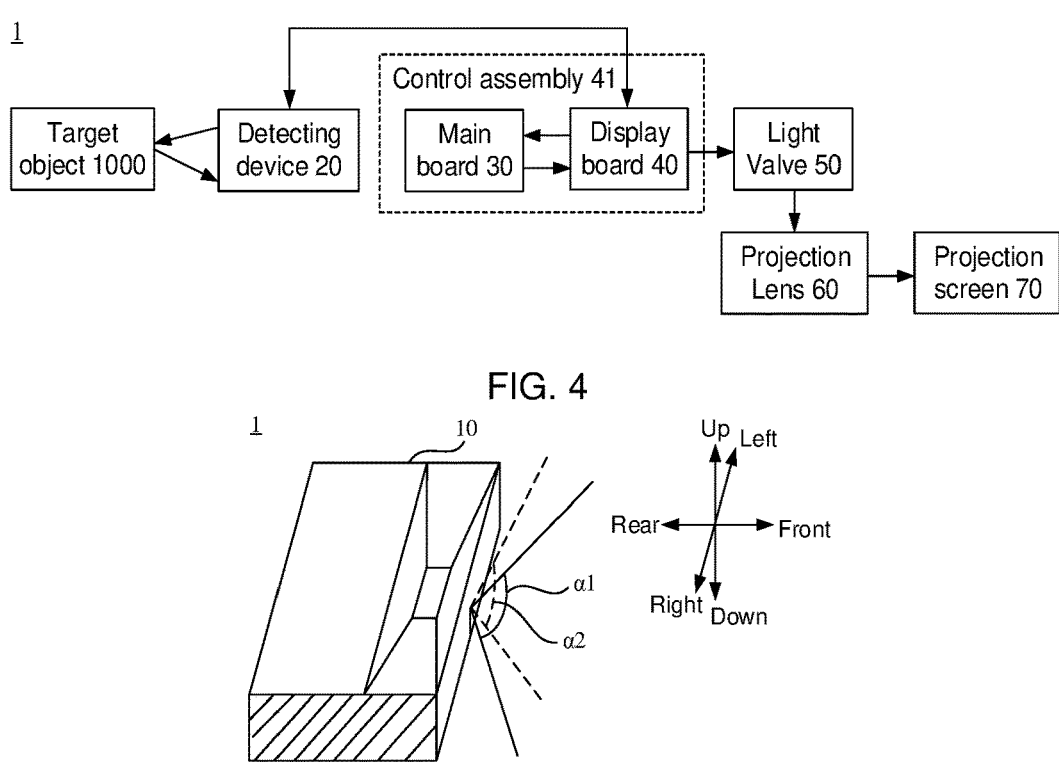
FIG. 4
FIG. 5

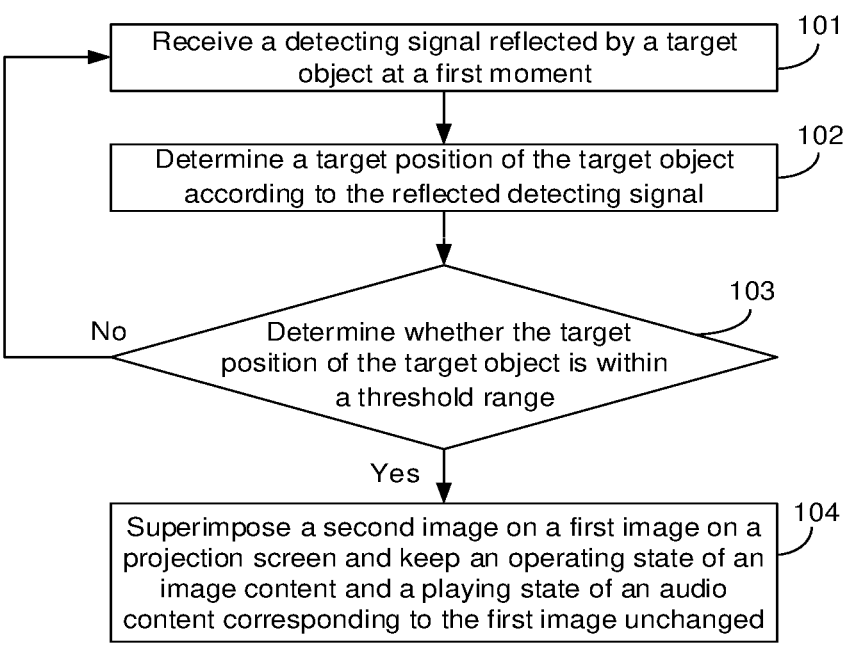

Receive a detecting signal reflected by a target object at a first moment — 101

Determine a target position of the target object according to the reflected detecting signal — 102

Determine whether the target position of the target object is within a threshold range — 103

No

Yes

Superimpose a second image on a first image on a projection screen and keep an operating state of an image content and a playing state of an audio content corresponding to the first image unchanged — 104

FIG. 6

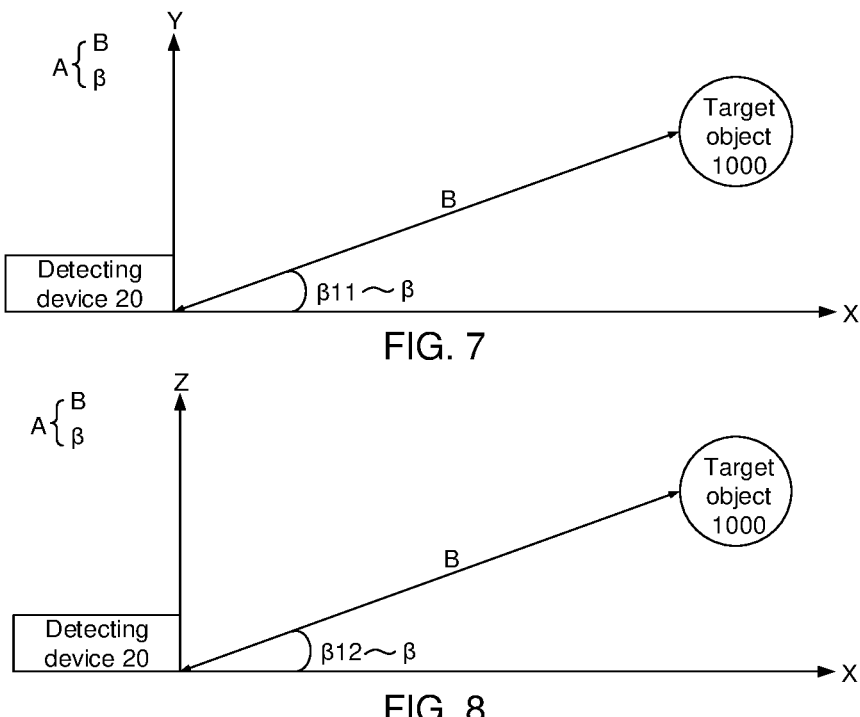

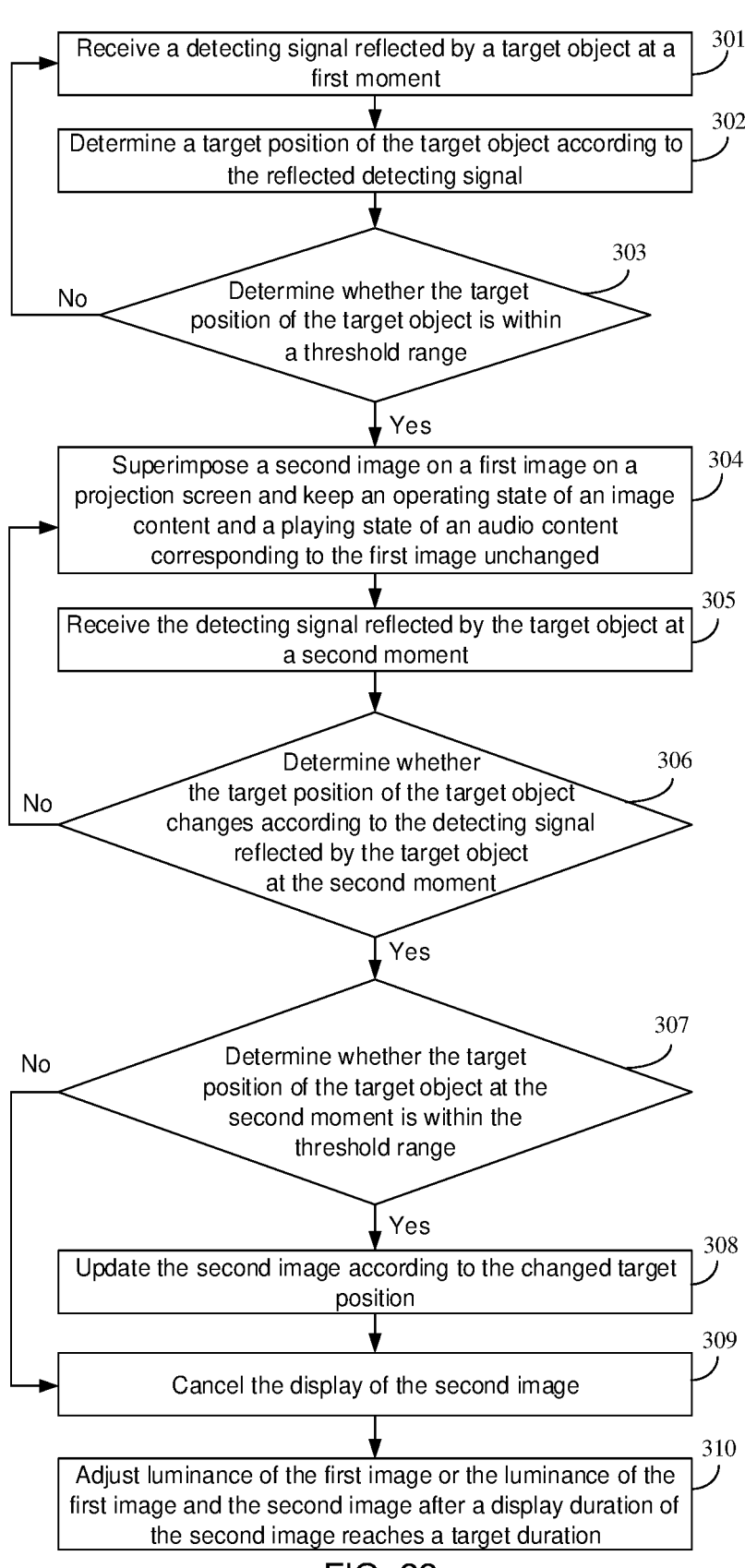

Receive a detecting signal reflected by a target object at a first moment — 301

Determine a target position of the target object according to the reflected detecting signal — 302

Determine whether the target position of the target object is within a threshold range — 303

No

Yes

Superimpose a second image on a first image on a projection screen and keep an operating state of an image content and a playing state of an audio content corresponding to the first image unchanged — 304

Receive the detecting signal reflected by the target object at a second moment — 305

Determine whether the target position of the target object changes according to the detecting signal reflected by the target object at the second moment — 306

No

Yes

Determine whether the target position of the target object at the second moment is within the threshold range — 307

No

Yes

Update the second image according to the changed target position — 308

Cancel the display of the second image — 309

Adjust luminance of the first image or the luminance of the first image and the second image after a display duration of the second image reaches a target duration — 310

FIG. 22

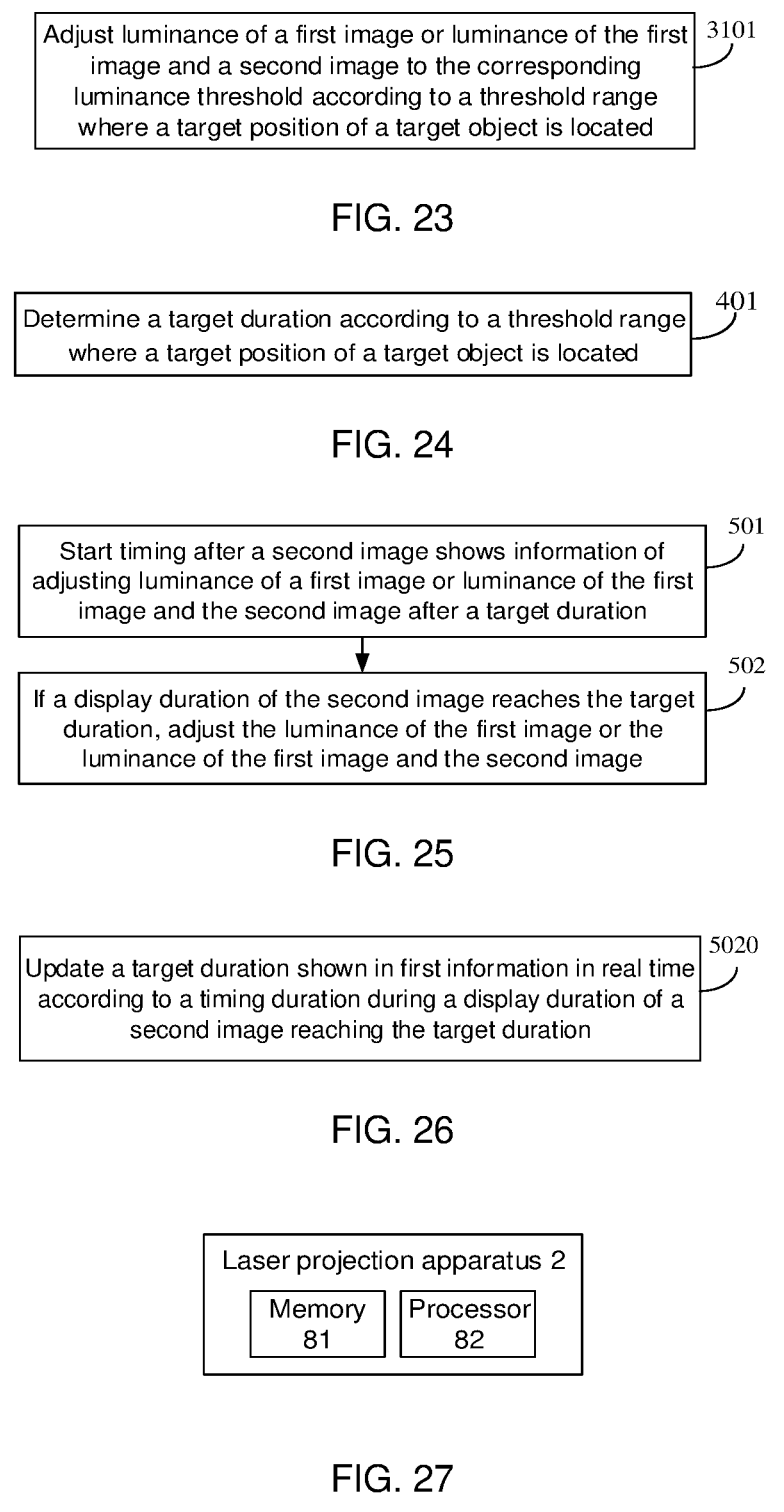

Adjust luminance of a first image or luminance of the first image and a second image to the corresponding luminance threshold according to a threshold range where a target position of a target object is located — 3101

FIG. 23

Determine a target duration according to a threshold range where a target position of a target object is located — 401

FIG. 24

Start timing after a second image shows information of adjusting luminance of a first image or luminance of the first image and the second image after a target duration — 501

If a display duration of the second image reaches the target duration, adjust the luminance of the first image or the luminance of the first image and the second image — 502

FIG. 25

Update a target duration shown in first information in real time according to a timing duration during a display duration of a second image reaching the target duration — 5020

FIG. 26

Laser projection apparatus 2

| Memory 81 | Processor 82 |

FIG. 27

LASER PROJECTION APPARATUS AND OPERATING METHOD THEREOF

CROSS-REFERENCE TO RELATED APPLICATIONS

This application is a continuation application of International Patent Application No. PCT/CN2021/089277, filed on Apr. 23, 2021, pending, which claims priority to Chinese Patent Application No. 202011480448.X, filed on Dec. 15, 2020, both of which are incorporated herein by reference in their entireties.

TECHNICAL FIELD

The present disclosure relates to the field of laser projection technologies, and in particular, to a laser projection apparatus and an operating method of a laser projection apparatus.

BACKGROUND

With the development of laser projection technologies, consumers have increasingly high requirements for the projected images of laser projection apparatuses. The laser projection technologies use beams of three primary colors as a laser source, which may truly reproduce rich and gorgeous colors of the objective world.

SUMMARY

In an aspect, a laser projection apparatus is provided. The laser projection apparatus includes a housing, a detecting device, a projection screen, and a control assembly. The detecting device is configured to send out a detecting signal and receive the detecting signal reflected by a target object. The projection screen is configured to receive projection beams, so as to display a projected image. The control assembly is electrically connected to the detecting device. The control assembly is configured to: determine a target position of the target object according to the detecting signal received by the detecting device at a first moment; if determining that the target position of the target object is within a threshold range, superimpose a second image on a first image on the projection screen, control the second image to show that the first image is adjusted after a target duration, and adjust at least one of the image content or the audio content corresponding to the projected image. The target position is a position of the target object relative to the laser projection apparatus. The projected image is a display image provided by superimposing the first image and the second image. The first image is a main image displayed on the projection screen by the laser projection apparatus, so as to show a main content of the projected image. The second image includes at least one of first information or second information. The first information includes text, and the second information includes image, so that the second information shows a change of a relative position between the target object and the laser projection apparatus through images or a change of the target duration through images.

In another aspect, an operating method for a laser projection apparatus is provided. The laser projection apparatus includes a detecting device and a projection screen. The detecting device is configured to send a detecting signal and receive the detecting signal reflected by a target object. The projection screen is configured to receive projection beams, so as to display a projected image. The method includes:

receiving the detecting signal reflected by the target object at a first moment; determining a target position of the target object according to the reflected detecting signal; and, if determining that the target position of the target object is within at least one threshold range, superimposing a second image on a first image on the projection screen, keeping an operating state of an image content and a playing state of an audio content corresponding to the first image unchanged. The target position is a position of the target object relative to the laser projection apparatus. The projected image is a display image provided by superimposing the first image and the second image. The first image is a main image displayed on the projection screen by the laser projection apparatus, so as to show a, main content of the projected image. The second image includes at least one of first information or second information. The first information includes text, and the second information includes image, so that the second information shows a change of a relative position between the target object and the laser projection apparatus through images or a change of at least one target duration through images.

BRIEF DESCRIPTION OF THE DRAWINGS

In order to describe the technical solutions in the present disclosure more clearly, accompanying drawings to be used in some embodiments of the present disclosure will be introduced briefly below. However, the accompanying drawings to be described below are merely accompanying drawings of some embodiments of the present disclosure, and a person of ordinary skill in the art may obtain other drawings according to these drawings. In addition, the accompanying drawings to be described below may be regarded as schematic diagrams but are not limitations on an actual size of a product, an actual process of a method and an actual timing of a signal involved in the embodiments of the present disclosure.

FIG. 3 is a diagram showing another structure of a laser projection apparatus, in accordance with some embodiments;

FIG. 4 is a block diagram of another laser projection apparatus, in accordance with some embodiments;

FIG. 5 is a diagram showing yet another structure of a laser projection apparatus, in accordance with some embodiments;

FIG. 6 is a flow chart of steps performed by a laser projection apparatus, in accordance with some embodiments;

FIG. 7 is a schematic diagram of a target position of a target object, in accordance with some embodiments;

FIG. 8 is another schematic diagram of a target position of a target object, in accordance with some embodiments;

FIG. 20 is yet another flow chart of steps performed by a laser projection apparatus, in accordance with some embodiments;

FIG. 22 is another flow chart of an operating method of a laser projection apparatus, in accordance with some embodiments;

FIG. 23 is yet another flow chart of an operating method of a laser projection apparatus, in accordance with some embodiments;

FIG. 24 is yet another flow chart of an operating method of a laser projection apparatus, in accordance with some embodiments;

FIG. 25 is yet another flow chart of an operating method of a laser projection apparatus, in accordance with some embodiments;

FIG. 26 is yet another flow chart of an operating method of a laser projection apparatus, in accordance with some embodiments; and FIG. 27 is a block diagram of yet another structure of a laser projection apparatus, in accordance with some embodiments.

DETAILED DESCRIPTION

Figure 1:
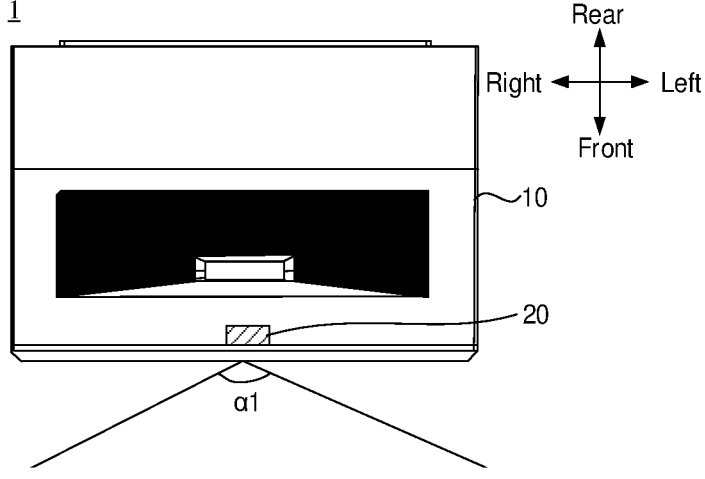
FIG. 1 is a diagram showing a structure of a laser projection apparatus, in accordance with some embodiments.

Some embodiments of the present disclosure will be clearly and completely described below with reference to the accompanying drawings. However, the described embodiments are merely some but not all embodiments of the present disclosure. All other embodiments obtained by a person of ordinary skill in the art based on embodiments of the present disclosure shall be included in the protection scope of the present disclosure.

Unless the context requires otherwise, throughout the specification and the claims, the term "comprise" and other forms thereof such as the third-person singular form "comprises" and the present participle form "comprising" are construed as an open and inclusive meaning, i.e., "including, but not limited to." In the description of the specification, the terms such as "one embodiment," "some embodiments," "exemplary embodiments," "example," "specific example," or "some examples" are intended to indicate that specific features, structures, materials, or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics may be included in any one or more embodiments or examples in any suitable manner.

Hereinafter, the terms such as "first" and "second" are used for descriptive purposes only and are not to be construed as indicating or implying the relative importance or implicitly indicating the number of indicated technical features. Thus, features defined by "first" or "second" may explicitly or implicitly include one or more of the features. In the description of the embodiments of the present disclosure, the term "a plurality of" or "the plurality of" means two or more unless otherwise specified.

In the description of some embodiments, the term "connected," and the derivative thereof may be used. The term "connected" should be understood in a broad sense. For example, the term "connected" may represent a fixed connection, a detachable connection, or a one-piece connection, or may represent a direct connection, or may represent an indirect connection through an intermediate medium. The embodiments disclosed herein are not necessarily limited to the content herein.

The phrase "at least one of A, B, and C" has the same meaning as the phrase "at least one of A, B, or C", both including the following combinations of A, B, and C: only A, only B, only C, a combination of A and B, a combination of A and C, a combination of B and C, and a combination of A, B, and C.

The phrase "A and/or B" includes the following three combinations: only A, only B, and a combination of A and B.

As used herein, the term "if" is, optionally, construed as "when" or "in a case where" or "in response to determining that" or "in response to detecting," depending on the context. Similarly, depending on the context, the phrase "if it is determined that" or "if [a stated condition or event] is detected" is optionally construed as "in a case where it is determined that" or "in response to determining that" or "in a case where [the stated condition or event] is detected" or "in response to detecting [the stated condition or event]."

The use of the phase "applicable to" or "configured to" herein means an open and inclusive expression, which does not exclude devices that are applicable to or configured to perform additional tasks or steps.

The term such as "about," "substantially," and "approximately" as used herein includes a stated value and an average value within an acceptable range of deviation of a particular value. The acceptable range of deviation is determined by a person of ordinary skill in the art, considering measurement in question and errors associated with measurement of a particular quantity (i.e., limitations of a measurement system).

The term such as "parallel," "perpendicular," or "equal" as used herein includes a stated condition and a condition similar to the stated condition. A range of the similar condition is within an acceptable deviation range, and the acceptable deviation range is determined by a person of ordinary skill in the art, considering measurement in question and errors associated with measurement of a particular quantity (i.e., the limitations of a measurement system).

Generally, a laser projection apparatus emits laser beams and projects the laser beams onto a projection screen, so as to display a projected image on the projection screen. However, the laser beams emitted by the laser projection apparatus have high luminance, and in a case where a distance between a user and the projection screen is small, the high luminance laser beams may cause damage to eyes.

In order to solve the above problem, some embodiments of the present disclosure provide a laser projection apparatus 1.

Figure 2:
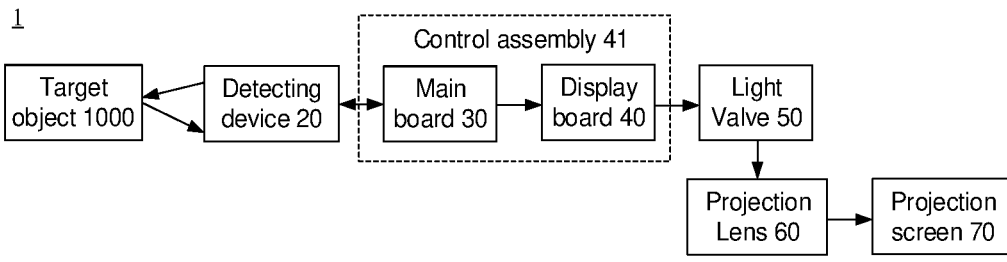
FIG. 2 is a block diagram of a laser projection apparatus, in accordance with some embodiments.

FIG. 1 is a diagram showing a structure of a laser projection apparatus, in accordance with some embodiments. FIG. 2 is a block diagram of a laser projection apparatus, in accordance with some embodiments. FIG. 3 is a diagram showing another structure of a laser projection apparatus, in accordance with some embodiments.

As shown in FIGS. 1 and 2, the laser projection apparatus 1 includes a housing 10, a detecting device 20, a main board 30, a display board 40, a light valve 50, a projection lens 60, and a projection screen 70. The main board 30, the display board 40, the light valve 50, and the projection lens 60 each are disposed in the housing 10, and the main board 30 is configured to send an image signal to the display board 40. The display board 40 is configured to control the light valve 50 according to the image signal, so as to modulate illumination beams irradiated to the light valve 50 into projection beams through the light valve 50 and transmit the projection beams to the projection lens 60. The projection lens 60 is configured to project the projection beams onto the projection screen 70. The projection screen 70 is configured to receive the projected beams, so as to display a projected image 80 (as shown in FIG. 3). Here, the main board 30 and the display board 40 constitute a control assembly 41.

The light valve 50 may be a reflective light valve. The light valve 50 includes a plurality of reflective plates, and each reflective plate may correspond to a pixel in the projected image 80. The plurality of reflective plates may be adjusted according to the projected image 80 to be displayed, so that the reflective plates corresponding to the pixels of the projected image 80 that need to be displayed in a bright state may reflect light beams to the projection lens 60, and the light beams reflected to the projection lens 60 may be referred to as the projection beams. In this way, the light valve 50 may modulate the illumination beams to obtain the projection beams and achieve the display of the projected image 80 through the projection beams.

For example, the light valve 50 is a digital micromirror device (DMD). The DMD includes a plurality of (e.g., thousands of) micromirrors that may be individually driven to rotate. The plurality of micromirrors may be arranged in an array. One micromirror (e.g., each micromirror) corresponds to one pixel in the projected image 80 to be displayed. The image signal may be converted into digital codes such as 0 or 1 after being processed, and the micromirror may swing in response to these digital codes. Gray scales of pixels in a frame image are achieved by controlling durations of the micromirrors in an ON state and an OFF state. In this way, the digital micromirror device may modulate the illumination beams, so as to achieve the display of the projected image 80.

The display board 40 may generate a light valve control signal according to pixel values of the pixels in the projected image 80 and control the light valve 50 to operate through the light valve control signal, so as to modulate the illumination beams irradiated to a surface of the light valve 50 into the projection beams and transmit the projection beams to the projection lens 60.

The projection lens 60 may project the projection beams transmitted by the light valve 50 onto the projection screen 70, so as to display the projected image 80 on the projection screen 70.

The detecting device 20 in some embodiments of the present disclosure will be described in detail below.

As shown in FIG. 2, the detecting device 20 is disposed on the housing 10 and is electrically connected to the main board 30. The detecting device 20 is configured to send out a detecting signal, receive the detecting signal reflected by a target object 1000, determine a target position A of the target object 1000 according to the reflected detecting signal, and send the target position A to the main board 30. Alternatively, the detecting device 20 is configured to send out the detecting signal, receive the detecting signal reflected by the target object 1000, and send the reflected detecting signal to the main board 30, so that the main board 30 determines the target position A of the target object 1000 according to the received detecting signal.

Here, the target object 1000 is a person or an animal within a range that the detecting device 20 may detect. The target position A is a position of the target object 1000 relative to the laser projection apparatus 1 (e.g., the detecting device 20).

It will be noted that, in some embodiments, the detecting device 20 may also be arranged in the housing 10, and the present disclosure does not limit the setting position of the detecting device 20, as long as the detecting device 20 may send out the detecting signal to the outside of the housing 10.

The detecting device 20 may be a millimeter wave radar sensor, and the detecting signal sent by the detecting device 20 may be a millimeter wave. In a case where the detecting device 20 determines the target position A of the target object 1000, when the main board 30 needs to obtain the target position A of the target object 1000, the main board 30 may send a position acquisition request to the detecting device 20, and the detecting device 20 may send the target position A of target object 1000 to the main board 30 after receiving the position acquisition request. Alternatively, there is no need for the main board 30 to send the position acquisition request to the detecting device 20, and the detecting device 20 sends the target position A to the main board 30 after determining the target position A of the target object 1000.

FIG. 4 is a block diagram of another laser projection apparatus, in accordance with some embodiments.

Of course, in some embodiments, the detecting device 20 may also be connected to the main board 30 through the display board 40. For example, as shown in FIG. 4, the detecting device 20 is electrically connected to the display board 40, and the display board 40 is electrically connected to the main board 30. In this case, considering an example in which the detecting device 20 determines the target position A of the target object 1000, when the main board 30 needs to obtain the target position A of the target object 1000, the main board 30 may send the position acquisition request to the display board 40, and the display board 40 sends the position acquisition request to the detecting device 20. After receiving the position acquisition request, the detecting device 20 sends the target position A of the target object 1000 to the display board 40. Afterwards, the display board 40 sends the target position A of the target object 1000 to the main board 30. Alternatively, there is no need for the main board 30 to send the position acquisition request to the display board 40. After the detecting device 20 determines the target position A of the target object 1000, the detecting device 20 sends the target position A of the target object 1000 to the display board 40, and the display board 40 sends the target position A of the target object 1000 to the main board 30.

In some embodiments, as shown in FIG. 3, the detecting device 20 is located on a side of the housing 10 away from the projection screen 70. For example, the detecting device 20 is located on a front side of the housing 10, and the front side refers to a side of the housing 10 proximate to the user. Alternatively, the detecting device 20 is located on a surface of the housing 10 that intersects with (e.g., approximately perpendicular to) the projection screen 70. For example, the detecting device 20 is located on an upper surface of the housing 10. Alternatively, the detecting device 20 is located inside the housing 10 and proximate to the front side of the housing 10. Alternatively, the detecting device 20 is located inside the housing 10 and proximate to the upper surface of the housing 10.

FIG. 5 is a diagram showing yet another structure of a laser projection apparatus, in accordance with some embodiments.

In some embodiments, as shown in FIGS. 1 and 5, a first angle $\alpha 1$ of the detecting device 20 on a first plane is any value within a first preset range. The first angle $\alpha 1$ is an angle that the detecting device 20 may detect on the first plane. For example, the first angle $\alpha 1$ is greater than 0° and less than 150°. The first plane is parallel to a plane where a length direction and a width direction of the laser projection apparatus 1 are located. For example, the plane is a plane carrying the laser projection apparatus 1, the length direction of the laser projection apparatus 1 refers to the left-right direction in FIG. 1, and the width direction of the laser projection apparatus 1 refers to the front-rear direction in FIG. 1

As shown in FIGS. 3 and 5, a second angle $\alpha 2$ of the detecting device 20 on a second plane is any value within a second preset range. The second angle $\alpha 2$ is an angle that the detecting device 20 may detect on the second plane. For example, the second angle $\alpha 2$ is greater than 0° and less than 110°. The second plane is parallel to a plane where the width direction and a height direction (e.g., the up-down direction in FIG. 3) of the laser projection apparatus 1 are located. The second plane is perpendicular to the first plane.

Steps performed by the laser projection apparatus 1 in some embodiments of the present disclosure are described in detail below.

FIG. 6 is a flow chart of steps performed by a laser projection apparatus, in accordance with some embodiments.

In some embodiments, the laser projection apparatus 1 is configured to perform steps 101 to 104 (e.g., S101 to S104).

In step 101, a detecting signal reflected by the target object 1000 at a first moment is received.

For example, the detecting device 20 in the laser projection apparatus 1 sends out the detecting signal in real time and receives the detecting signal reflected by the target object 1000 in real time.

In step 102, the target position A of the target object 1000 is determined according to the reflected detecting signal.

For example, the detecting device 20 or the main board 30 in the laser projection apparatus 1 determines the target position A of the target object 1000 according to the detecting signal sent out by the detecting device 20 and the detecting signal reflected by the target object 1000 at the first moment.

The target position A may include a target distance B. Alternatively, the target position A may also include a target distance B and a position angle $\beta$. The target distance B is a distance between the target object 1000 and the laser projection apparatus 1 (e.g., the detecting device 20). The position angle $\beta$ is an angle of the target object 1000 relative to the laser projection apparatus 1 (e.g., the detecting device 20). Here, the target position A of the target object 1000 at the first moment may be referred to as a first target position. The target distance B included by the first target position may be referred to as a first target distance. The position angle $\beta$ included by the first target position may be referred to as a first position angle.

Figures 9, 10:
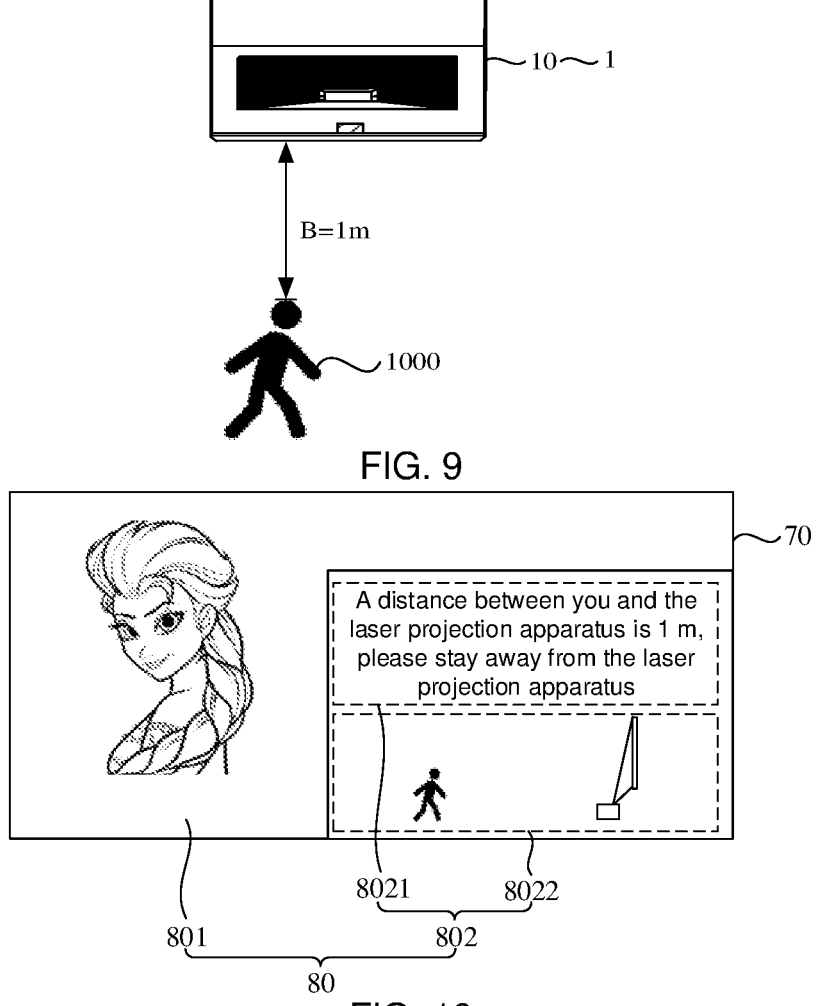
FIG. 9 is a schematic diagram of a target distance between a target object and a laser projection apparatus, in accordance with some embodiments.
FIG. 10 is a schematic diagram of a projected image, in accordance with some embodiments.

FIG. 7 is a schematic diagram of a target position of a target object, in accordance with some embodiments. FIG. 8 is another schematic diagram of a target position of a target object, in accordance with some embodiments. FIG. 9 is a schematic diagram of a target distance between a target object and a laser projection apparatus, in accordance with some embodiments.

The angles that the detecting device 20 may detect are different from each other on different planes, and the target object 1000 has a certain height. Therefore, the position angle $\beta$ included by the target position A of the target object 1000 corresponds to different projected angles on different planes. The projected angle may refer to a relative angle between the detecting device 20 and an orthogonal projection of the target object 1000 on a two-dimensional plane (e.g., the first plane or the second plane) where the detecting device 20 is located. Here, the projected angle of the position angle $\beta$ on the first plane may be referred to as a first position sub-angle $\beta 11$, and the projected angle of the position angle $\beta$ on the second plane may be referred to as a second position sub-angle $\beta 12$.

For example, as shown in FIG. 7, a plane rectangular coordinate system is established with a position of the detecting device 20 in the laser projection apparatus 1 as an origin. The plane rectangular coordinate system (e.g., the coordinate system XY) includes a first axis X and a second axis Y. The first axis X may be parallel to the length direction of the laser projection apparatus 1, and the second axis Y may be parallel to the width direction of the laser projection apparatus 1. The first position sub-angle $\beta 11$ of the target object 1000 is an included angle between the first axis X and a line connecting the target object 1000 and the origin of the coordinate system XY.

For example, as shown in FIG. 8, a plane rectangular coordinate system is established with the position of the detecting device 20 in the laser projection apparatus 1 as an origin. The plane rectangular coordinate system (e.g., the coordinate system XZ) includes the first axis X and a third axis Z, and the third axis Z is perpendicular to a plane (e.g., the first plane) formed by the first axis X and the second axis Y. The third axis Z may be parallel to a height direction of the laser projection apparatus 1. The second position sub-angle $\beta 12$ of the target object 1000 is an included angle between the first axis X and a line connecting the target object 1000 and the origin of the coordinate system XZ.

In a case where the detecting device 20 is the millimeter wave radar sensor, the detecting device 20 sends out a detecting signal. When the detecting signal propagates to the target object 1000, the detecting signal is reflected back to the detecting device 20 by the target object 1000, so that the detecting device 20 may receive the reflected detecting signal. In this case, the detecting device 20 or the main board 30 may determine a difference signal according to the sent detecting signal and the reflected detecting signal and determine the target distance B (e.g., the first target distance) of the target object 1000 according to a frequency of a peak value of the difference signal. For example, as shown in FIG. 9, the target distance B of the target object 1000 is 1 m.

Moreover, the detecting device 20 includes at least two receiving antennas. The detecting device 20 or the main board 30 may also determine the position angle β (e.g., the first position angle) of the target object 1000 according to a difference between phase angles of two difference signals corresponding to two adjacent receiving antennas. Here, the receiving antenna is used to receive the detecting signal reflected by the target object 1000, and there is a preset distance between the two adjacent receiving antennas, so that the two adjacent receiving antennas have different distances from the target object 1000.

It will be noted that, the difference signal may be obtained by calculating a difference between an angular frequency of the detecting signal received by the detecting device 20 and an angular frequency of the detecting signal sent out by the detecting device 20, as well as a difference between a phase of the detecting signal received by the detecting device 20 and a phase of the detecting signal sent out by the detecting device 20. Of course, the disclosure is not limited thereto.

In step 103, it is determined whether the target position A of the target object 1000 is within a threshold range. If so, the step 104 is performed; if not, the step 101 is performed.

For example, after the detecting device 20 or the main board 30 determines the target position A of the target object 1000, the main board 30 determines whether the target position A of the target object 1000 is within the threshold range.

The threshold range is a preset threshold, and the threshold range includes at least one of a distance range or an angle range. One threshold range or a plurality of different threshold ranges may be preset, and different threshold ranges include different distance ranges and different angle ranges. The distance range corresponds to the target distance B, and the angle range corresponds to the position angle β.

The position angle β includes the first position sub-angle β11 and the second position sub-angle β12. Therefore, in a case where the threshold range includes the angle range, the angle range includes a first angle range and a second angle range. The first angle range corresponds to angles (e.g., the first position sub-angle β11) in the first plane. The second angle range corresponds to angles (e.g., the second position sub-angle β12) in the second plane.

In some embodiments, the angle corresponding to the first angle range is less than or equal to the first angle α1, and the angle corresponding to the second angle range is less than or equal to the second angle α2.

In some embodiments, if the first position sub-angle β11 of the position angle β is within the first angle range or the second position sub-angle β12 of the position angle β is within the second angle range, the laser projection apparatus 1 (e.g., the main board 30) may determine that the target object 1000 is within the threshold range.

In some embodiments, if the target distance B of the target object 1000 is less than or equal to a distance threshold D, the main board 30 may determine that the target position A of the target object 1000 is within the threshold range. For example, the distance threshold D is 1 m. Here, the distance threshold D is the maximum distance that can be displayed on a prompt image (e.g., the second image described later) on the projection screen 70. For example, the distance threshold D is the maximum value among upper limits of the distance ranges included by the plurality of threshold ranges. If the target distance B of the target object 1000 is greater than the distance threshold D, there is no need for the main board 30 to control the display board 40 to display the prompt image.

In step 104, a second image 802 is superimposed on a first image 801 on the projection screen 70, and an operating state of an image content and a playing state of an audio content corresponding to the first image 801 remain unchanged.

For example, if the main board 30 in the laser projection apparatus 1 determines that the target position A of the target object 1000 is within the threshold range, the main board 30 may control the display board 40, so as to superimpose the second image 802 on the first image 801 on the projection screen 70 and keep the operating state of the image content and the playing state of the audio content corresponding to the first image 801 unchanged. For example, the main board 30 controls the display board 40, so as to make the first image 801 continue to show the main content of the projected image 80, and controls a loudspeaker in the laser projection apparatus 1 to continue to play the sound corresponding to the first image 801. It will be noted that the image content may include luminance and gray scale of the pixel. Here, the luminance of the pixel may be adjusted by a laser source driving assembly 90 and a laser source 91, and the laser source driving assembly 90 and the laser source 91 will be described later. The gray scale of the pixel may be adjusted by the image signal. The audio content may refer to sound information corresponding to the projected image 80.

FIG. 10 is a schematic diagram of a projected image, in accordance with some embodiments.

As shown in FIG. 10, the projected image 80 is a display image formed by superimposing the first image 801 and the second image 802. In a case where the second image 802 does not need to be displayed, the projected image 80 only includes the first image 801. That is to say, the projected image 80 may include the first image 801 and the second image 802. Alternatively, the projected image 80 may include the first image 801.

It will be noted that, the first image 801 occupies most of a region of the projection screen 70, and the first image 801 is a main image displayed by the laser projection apparatus 1 on the projection screen 70, so as to show the main content of the projected image 80. The second image 802 occupies a small region of the projection screen 70, and the second image 802 is a prompt image used to remind the user to stay away from the laser projection apparatus 1. For example, the second image 802 shows a relative position relationship between the target object 1000 and the laser projection apparatus 1. Alternatively, the second image 802 shows a change of a target duration, and the target duration is used to remind the user of a display mode of the laser projection apparatus 1 after the target duration ends, such as turning off the projected image 80.

The second image 802 may include at least one of first information 8021 or second information 8022. The first information 8021 includes text, so as to show the target position A of the target object 1000 through a text. For example, the first information 8021 is "A distance between you and the laser projection apparatus is 1 m, please stay away from the laser projection apparatus." The second information 8022 includes image, which may be displayed in a user interface (UI) animation manner. In some embodiments, the second image 802 shows a change of the relative position between the target object 1000 and the laser projection apparatus 1 through images or a change of the target duration through images. For example, the second information 8022 shows a countdown image.

Figure 11:
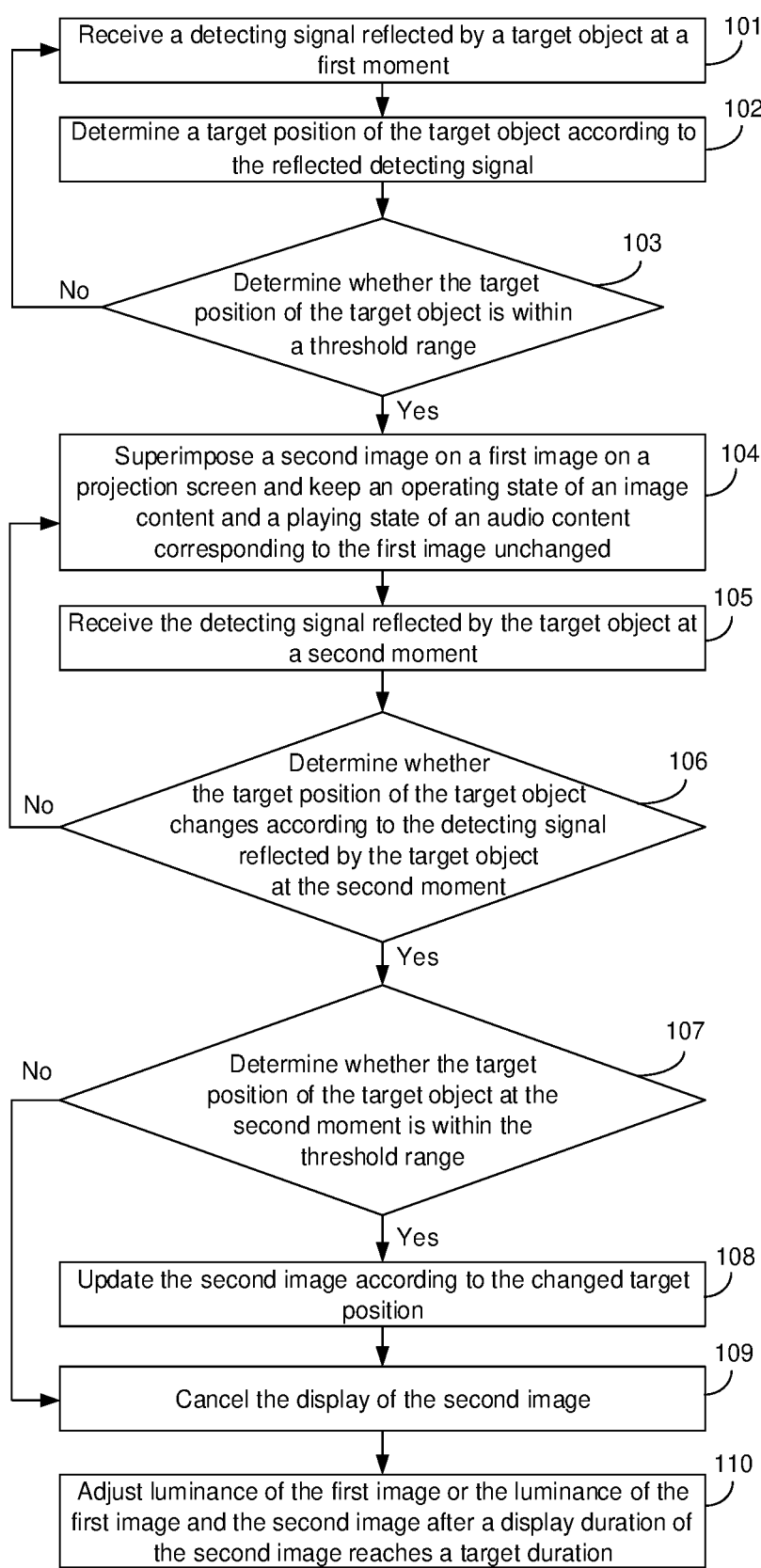
FIG. 11 is another flow chart of steps performed by a laser projection apparatus, in accordance with some embodiments.

FIG. 11 is another flow chart of steps performed by a laser projection apparatus, in accordance with some embodiments.

In some embodiments, as shown in FIG. 11, after the step 104, the laser projection apparatus 1 is further configured to perform step 105 to step 110 (e.g., S105 to S110).

In step 105, a detecting signal reflected by the target object 1000 at a second moment is received.

For example, the detecting device 20 in the laser projection apparatus 1 receives the detecting signal reflected by the target object 1000 at the second moment. The second moment is a moment after the first moment.

In step 106, it is determined whether the target position A of the target object 1000 changes according to the detecting signal reflected by the target object 1000 at the second moment. If so, the step 107 is performed; if not, the step 104 is performed.

For example, the detecting device 20 or the main board 30 determines the target position A of the target object 1000 at the second moment according to the detecting signal reflected by the target object 1000 at the second moment. Here, the target position A of the target object 1000 at the second moment may be referred to as a second target position. If the second target position is the same as the first target position, the main board 30 determines that the target position A of the target object 1000 remains unchanged. If the first target position is different from the second target position, the main board 30 determines that the target position A of the target object 1000 has changed.

It will be noted that the target distance B included by the second target position may be referred to as a second target distance. The position angle β included by the second target position may be referred to as a second position angle.

In some embodiments, the main board 30 may determine whether the target position A of the target object 1000 changes according to at least one of the target distance B or the position angle β of the target object 1000.

For example, in a case where the target position A of the target object 1000 includes the target distance B and the position angle β, if the first target distance and the second target distance of the target object 1000 are different from each other or the first position angle and the second position angle of the target object 1000 are different from each other, the main board 30 determines that the target position A of the target object 1000 has changed. If the first target distance of the target object 1000 is the same as the second target distance of the target object 1000, and the first position angle of the target object 1000 is the same as the second position angle of the target object 1000, the main board 30 determines that the target position A of the target object 1000 remains unchanged.

If the first target distance and the second target distance of the target object 1000 are different from each other, the main board 30 determines that the target distance B of the target object 1000 has changed. If the first target distance and the second target distance of the target object 1000 are same, the main board 30 determines that the target distance B of the target object 1000 remains unchanged.

If the first position angle and the second position angle of the target object 1000 are different from each other, the main board 30 determines that the position angle β of the target object 1000 has changed. If the first position angle and the second position angle of the target object 1000 are same, the main board 30 determines that the position angle β of the target object 1000 remains unchanged.

In step 107, it is determined whether the target position A of the target object 1000 at the second moment is within the threshold range. If so, the step 108 is performed; if not, the step 109 is performed.

For example, the main board 30 in the laser projection apparatus 1 determines whether the target position A (e.g., the second target position) of the target object 1000 at the second moment is within the threshold range.

In step 108, the second image 802 is updated according to the changed target position A.

For example, in a case where the main board 30 determines that the target position A of the target object 1000 has changed, and the changed target position A (e.g., the second target position) is within the threshold range, the main board 30 updates the second image 802 according to the changed target position A.

Figure 12:
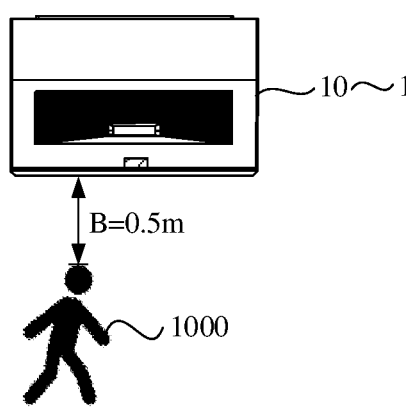
FIG. 12 is a schematic diagram of another target distance between a target object and a laser projection apparatus, in accordance with some embodiments.
Figure 13:
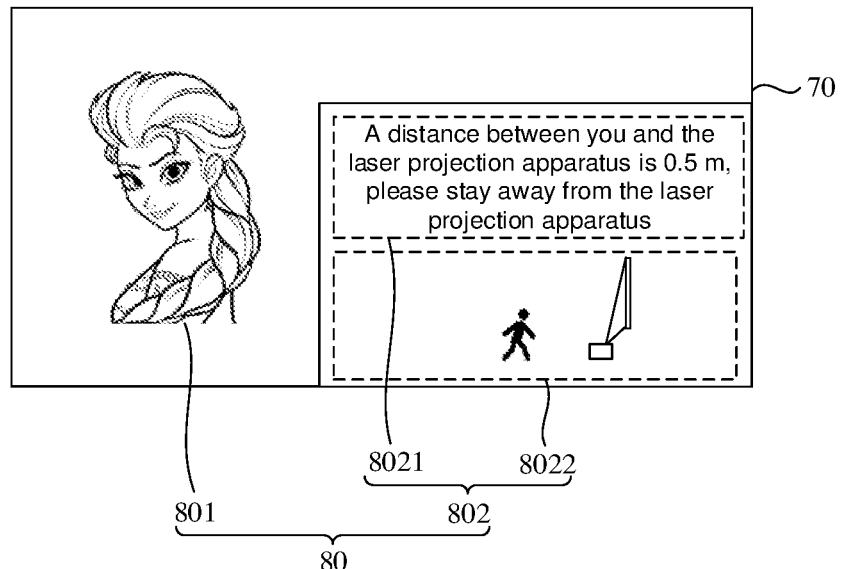
FIG. 13 is a schematic diagram of another projected image, in accordance with some embodiments.

FIG. 12 is a schematic diagram of another target distance between a target object and a laser projection apparatus, in accordance with some embodiments. FIG. 13 is a schematic diagram of another projected image, in accordance with some embodiments.

For example, as shown in FIGS. 9 and 12, in a case where the distance threshold D is 1 m, if the first target distance is 1 m and the second target distance is 0.5 m, the first target distance and the second target distance are different from each other, the main board 30 may determine that the target position A of the target object 1000 has changed. Moreover, since the second target distance is less than the distance threshold D (0.5 m<1 m), the changed target distance B is still within the distance range of the threshold range. In this case, the main board 30 may determine that the changed target position A is within the threshold range, so that the main board 30 may update the second image 802.

For example, the main board 30 updates the first information 8021 that "A distance between you and the laser projection apparatus is 1 m, please stay away from the laser projection apparatus" in FIG. 10 to the first information 8021 that "A distance between you and the laser projection apparatus is 0.5 m, please stay away from the laser projection apparatus" in FIG. 13. Meanwhile, the main board 30 updates the second information 8022 in FIG. 10 to the second information 8022 in FIG. 13.

In step 109, the display of the second image 802 is canceled.

In a case where the target position A of the target object 1000 has changed, and the changed target position A is outside the threshold range, the main board 30 determines that the target distance B of the target object 1000 is large, and the laser beams emitted by the laser projection apparatus 1 will not cause damage to the eyes, so that the main board 30 may cancel the display of the second image 802. Alternatively, in a case where the changed target position A is outside the threshold range, after a display duration of the second image 802 reaches the target duration, the main board 30 may cancel sending the image signal corresponding to the second image 802 to the display board 40.

In step 110, after the display duration of the second image 802 reaches the target duration, the luminance of the first image 801 is adjusted or the luminance of the first image 801 and the second image 802 is adjusted.

For example, after the display duration of the second image 802 reaches the target duration, the main board 30 may adjust the luminance of the first image 801 or the main board 30 may adjust the luminance of the first image 801 and the second image 802.

It will be noted that, after the step 104, the main board 30 may also directly perform the step 109 and the step 110.

In some embodiments, a plurality of luminance thresholds are preset in the laser projection apparatus 1, and the plurality of luminance thresholds may correspond to the plurality of threshold ranges, respectively.

For example, in a case where the plurality of threshold ranges include a first threshold range and a second threshold range, the plurality of luminance thresholds may include first luminance and second luminance, where the first luminance corresponds to the first threshold range, and the second luminance corresponds to the second threshold range. The first luminance is greater than the second luminance. The lower limit of the distance range corresponding to the first threshold range is greater than the upper limit of the distance range corresponding to the second threshold range.

In this case, if the target position A of the target object 1000 is within the first threshold range, the main board 30 may adjust the luminance of the first image 801 or the luminance of the first image 801 and the second image 802 to the first luminance. If the target position A of the target object 1000 is within the second threshold range, the main board 30 may adjust the luminance of the first image 801 or the luminance of the first image 801 and the second image 802 to the second luminance. Here, the first luminance may be 50% of original luminance, and the second luminance is 0. The original luminance may be the luminance of the first image 801 when the projected image 80 is normally displayed on the projection screen 70.

In this way, if the target position A of the target object 1000 is within the first threshold range, the luminance of the projected image 80 has little impact on the eyes. In this case, the main board 30 may reduce the luminance of the first image 801 or the luminance of, the first image 801 and the second image 802 to half of the original luminance, so as to protect the eyes while allowing the user to view the projected image 80 normally.

If the target position A of the target object 1000 is within the second threshold range, the luminance of the projected image 80 has a great impact on the eyes. In this case, the main board 30 may reduce the luminance of the first image 801 or the luminance of the first image 801 and the second image 802 to 0, so as to avoid damage to the eyes due to the high luminance of the projected image 80.

In some embodiments, the corresponding relationship between the plurality of threshold ranges and the plurality of luminance thresholds may be preset. In this way, after the display duration of the second image 802 reaches the target duration, the main board 30 may determine the luminance threshold corresponding to the threshold range where the target position A of the target object 1000 is located according to the corresponding relationship between the plurality of threshold ranges and the plurality of luminance thresholds.

Table 1 illustrates a corresponding relationship between the distance ranges of the different threshold ranges and the luminance thresholds. As shown in Table 1, the plurality of threshold ranges include the first threshold range and the second threshold range, the distance range corresponding to the first threshold range is greater than 0.5 m and less than or equal to 1 m, and the distance range corresponding to the second threshold range is greater than or equal to 0 m and less than or equal to 0.5 m. In this case, if the target distance B of target object 1000 is 0.5 m, the main board 30 determines that the target distance B of target object 1000 is within the distance range corresponding to the second threshold range. Since the luminance threshold corresponding to the second threshold range is 0, the main board 30 may adjust the luminance of the first image 801 or the luminance of the first image 801 and the second image 802 to 0. That is to say, the main board 30 turns off the first image 801 or the main board 30 turns off the first image 801 and the second image 802.

TABLE 1

| Corresponding relationship between the distance ranges of the different threshold ranges and the luminance thresholds | | |
|---|---|---|
| Threshold range | Distance range | Luminance threshold |
| Second threshold range | [0, 0.5 m] | 0 |
| First threshold range | (0.5 m, 1 m] | 50% of original luminance |

The main board 30 may determine the luminance threshold corresponding to the threshold range where the target position A of the target object 1000 is located according to the target position A of the target object 1000, so as to dynamically adjust the luminance of the first image 801 or the luminance of the first image 801 and the second image 802, so that flexible protection for the eyes is achieved. For example, after the main board 30 adjusts the luminance of the first image 801 or the luminance of the first image 801 and the second image 802 to 0, if the main board 30 determines that the target position A of the target object 1000 is within the first threshold range, the main board 30 may restore the luminance of the first image 801 or the luminance of the first image 801 and the second image 802 to 50% of the original luminance.

After the main board 30 determines that the target distance B of the target object 1000 is greater than the distance threshold D, the main board 30 may restore the luminance of the first image 801 or the luminance of the first image 801 and the second image 802 to the original luminance, without displaying the second image 802 according to the target distance B of the target object 1000.

Figure 14:
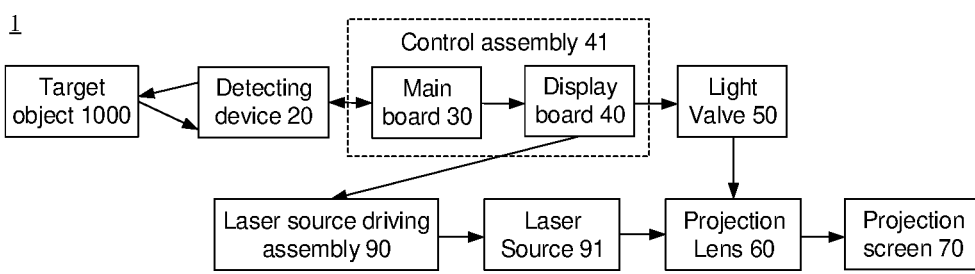
FIG. 14 is a diagram showing yet another structure of a laser projection apparatus, in accordance with some embodiments.
Figure 15:
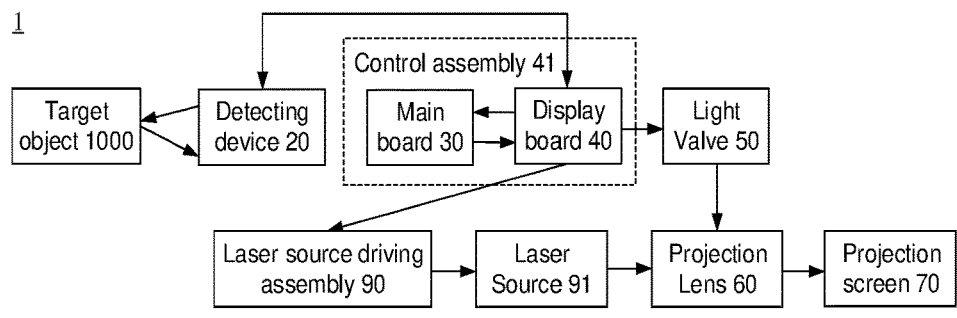
FIG. 15 is a diagram showing yet another structure of a laser projection apparatus, in accordance with some embodiments.

FIG. 14 is a diagram showing yet another structure of a laser projection apparatus, in accordance with some embodiments. FIG. 15 is a diagram showing yet another structure of a laser projection apparatus, in accordance with some embodiments.

In some embodiments, as shown in FIGS. 14 and 15, the laser projection apparatus 1 further includes a laser source driving assembly 90 and a laser source 91. The laser source 91 is configured to emit the illumination beams. The laser source driving assembly 90 is electrically connected to the laser source 91 and the control assembly 41 (e.g., the display board 40). The laser source driving assembly 90 is configured to adjust the luminance of the illumination beams emitted by the laser source 91 due to the control of the control assembly 41, so as to adjust the luminance of the first image 801 or the luminance of the first image 801 and the second image 802. For example, when the main board 30 adjusts the luminance of the first image 801 or the luminance of the first image 801 and the second image 802, the display board 40 may adjust the luminance of the illumination beams (e.g., laser beams) emitted by the laser source 91 by controlling the laser source driving assembly 90, so as to achieve the adjustment of the luminance of the projected image 80.

When the main board 30 adjusts the luminance of the first image 801 or the luminance of the first image 801 and the second image 802, the main board 30 may send a target luminance threshold to the display board 40. The target luminance threshold is the luminance threshold corresponding to the threshold range where the target position A of the target object 1000 is located. The display board 40 may determine a current control signal, according to the corresponding relationship between the luminance threshold and the current control signal, and send the current control signal to the laser source driving assembly 90. The laser source driving assembly 90 may respond to the current control signal and output a driving current to the laser source 91. The laser source 91 emits the illumination beams with the corresponding luminance due to the excitation of the driving current, so as to achieve the adjustment of the luminance of the first image 801 or the luminance of the first image 801 and the second image 802. The relationship between the luminance threshold and the current control signal may be preset.

It will be noted that, in the corresponding relationship between the luminance threshold and the current control signal, the luminance threshold is positively correlated with a duty ratio of the current control signal. That is to say, the less the luminance threshold is, the less the duty ratio of the current control signal is, and the less the driving current is. The greater the luminance threshold is, the greater the duty ratio of the current control signal is, and the greater the driving current is. The duty ratio refers to a percentage of the time when the circuit is turned on to the entire circuit operating cycle.

In some embodiments, the threshold range corresponds to the target duration, and a corresponding relationship between the threshold range and the target duration may be preset. For example, in a case where the threshold range includes the plurality of threshold ranges, a plurality of target durations are preset, and the plurality of threshold ranges correspond to the plurality of target durations respectively.

In this way, after the main board 30 determines the threshold range where the target position A of the target object 1000 is located, the main board 30 may determine the target duration corresponding to the threshold range where the target position A of the target object 1000 is located according to the corresponding relationship between the threshold range and the target duration. The target duration is positively correlated with the upper limit of the distance range of the threshold range. That is to say, the less the upper limit of the distance range of the threshold range, the less the target duration. The greater the upper limit of the distance range of the threshold range, the greater the target duration.

Figure 16:
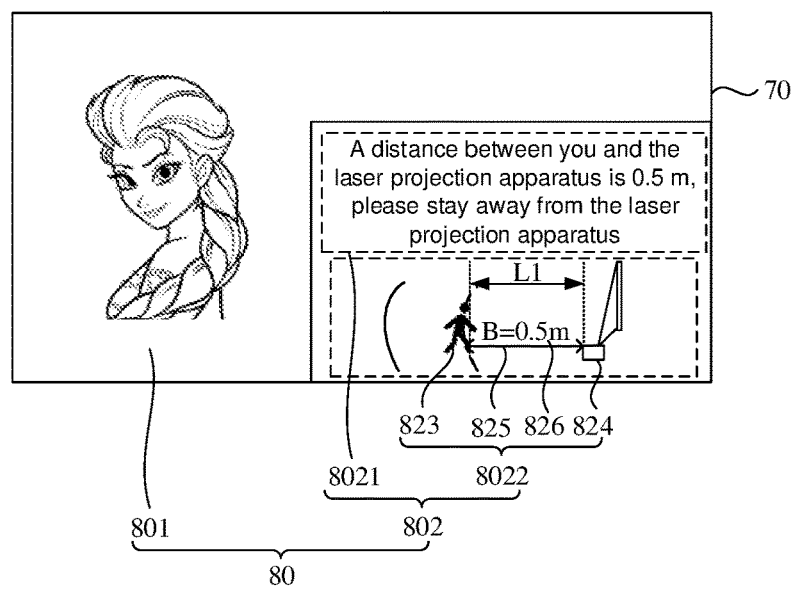
FIG. 16 is a schematic diagram of yet another projected image, in accordance with some embodiments.
Figure 17:
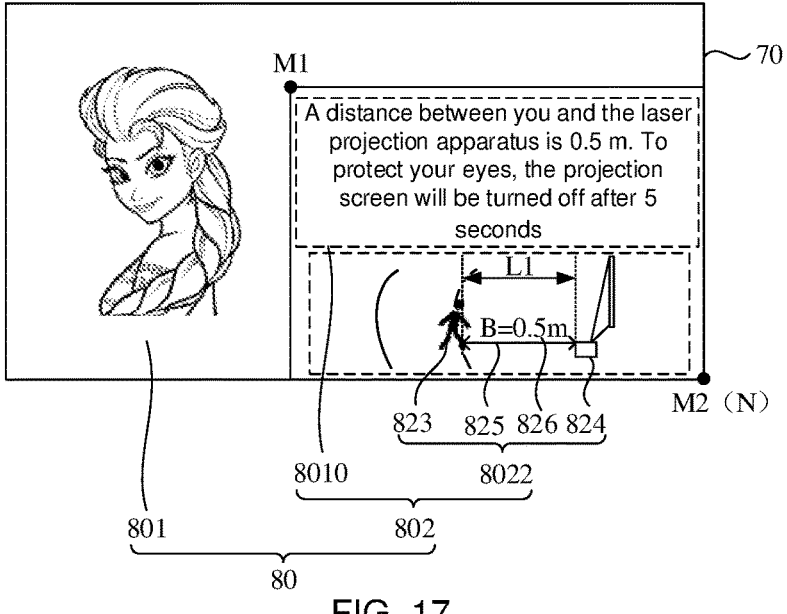
FIG. 17 is a schematic diagram of yet another projected image, in accordance with some embodiments.

FIG. 16 is a schematic diagram of yet another projected image, in accordance with some embodiments. FIG. 17 is a schematic diagram of yet another projected image, in accordance with some embodiments.

In some embodiments, as shown in FIGS. 16 and 17, the second information 8022 includes a first sub-image 823, a second sub-image 824, and a distance marking line 825. The first sub-image 823 indicates the target object 1000. The second sub-image 824 indicates the laser projection apparatus 1. The distance marking line 825 is located between the first sub-image 823 and the second sub-image 824 and is configured to mark the target distance B between the target object 1000 and the laser projection apparatus 1. The distance marking line 825 may directly show the target distance B, which is conducive to showing the change of the target distance B, so as to effectively remind the user.

In some embodiments, as shown in FIGS. 16 and 17, the second information 8022 further includes distance information 826, and the distance information 826 is configured to show a value of the target distance B of the target object 1000. The distance information 826 is proximate to the distance marking line 825. For example, as shown in FIGS. 16 and 17, the distance information 826 is "B=0.5 m" and is located above the distance marking line 825.

In some embodiments, during the process of generating the second image 802 according to the target position A of the target object 1000, the main board 30 may determine a display distance L1 between the first sub-image 823 and the second sub-image 824 in the second information 802 according to the distance threshold D, a display distance threshold L0 and the target distance B of the target object 1000.

The display distance L1 may be calculated according to a formula (1).

$$L1 = \frac{B}{D} \times L0; \tag{1}$$

The display distance threshold L0 is a preset fixed value, and the display distance threshold L0 is the maximum display distance L1 corresponding to the distance threshold D. That is to say, in a case where the target distance B of the target object 1000 is equal to the distance threshold D, the display distance L1 is maximum, and the maximum display distance L1 is equal to the display distance threshold L0.

Since the distance threshold D and the display distance threshold L0 each are fixed values, it may be seen that the display distance L1 is positively correlated with the target distance B according to the formula (1). For example, the shorter the target distance B is, the shorter the display distance L1 is; the longer the target distance B is, the longer the display distance L1 is.

In some embodiments, if the main board 30 determines that the target distance B of the target object 1000 decreases, the main board 30 may reduce the display distance L1 between an image (e.g., the first sub-image 823) of the target object 1000 and an image (e.g., the second sub-image 824) of the laser projection apparatus 1 in the second information 8022. If the main board 30 determines that the target distance B of the target object 1000 increases, the main board 30 may increase the display distance L1 between the image of the target object 1000 and the image of the laser projection apparatus 1 in the second information 8022.

For example, after the main board 30 determines that the target position A of the target object 1000 has changed, if the main board 30 determines that the second target position is closer to the laser projection apparatus 1 than the first target position (that is, the second target distance is less than the first target distance), the main board 30 determines that the target distance B of the target object 1000 decreases and the target object 1000 moves toward the laser projection apparatus 1. In this case, the main board 30 may reduce the display distance L1 between the image of the target object 1000 and the image of the laser projection apparatus 1 in the second information 8022 and update the first information 8021.

If the main board 30 determines that the second target position is farther away from the laser projection apparatus 1 than the first target position (that is, the second target distance is greater than the first target distance), the main board 30 determines that the target distance B of the target object 1000 increases and the target object 1000 moves in a direction away from the laser projection apparatus 1. In this case, the main board 30 may increase the display distance L1 between the image of the target object 1000 and the image of the laser projection apparatus 1 in the second information 8022 and update the first information 8021.

In some embodiments, in a case where the plurality of threshold ranges are preset, the second information 8022 may further include a plurality of threshold marking lines. The plurality of threshold marking lines correspond to the plurality of threshold ranges respectively. The plurality of threshold marking lines includes a target threshold marking line, and the target threshold marking line is the threshold marking line corresponding to the threshold range where the target position A of the target object 1000 is located. Among the plurality of threshold marking lines, a display effect of the target threshold marking line is different from that of other threshold marking lines. The display effect may refer to a line type, color, or thickness of the threshold marking line. Of course, the present disclosure is not limited thereto.

For example, the color of the target threshold marking line is a first color, the colors of other threshold marking lines among the plurality of threshold marking lines each are a second color, and the first color is different from the second color. Alternatively, the display effect of the target threshold marking line is flickering display, and the display effect of other threshold marking lines among the plurality of threshold marking lines is non-flicker display. Alternatively, the target threshold marking line is a solid line, and the other threshold marking lines among the plurality of threshold marking lines each are a dotted line.

Figure 18:
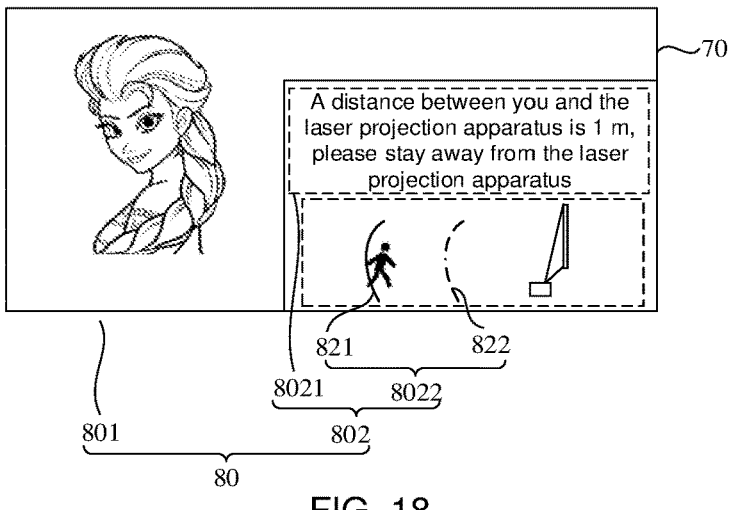
FIG. 18 is a schematic diagram of yet another projected image, in accordance with some embodiments.

FIG. 18 is a schematic diagram of yet another projected image, in accordance with some embodiments.

In some embodiments, in a case where the plurality of threshold ranges include the first threshold range and the second threshold range, the second information 8022 includes two threshold marking lines. For example, as shown in FIG. 18, the second information 8022 includes a first threshold marking line 821 and a second threshold marking line 822. The first threshold marking line 821 corresponds to the first threshold range, and the second threshold marking line 822 corresponds to the second threshold range. The upper limit of the distance range corresponding to the first threshold range is less than or equal to the distance threshold D. The lower limit of the distance range corresponding to the first threshold range is greater than the upper limit of the distance range corresponding to the second threshold range.

For example, in a case where the distance threshold D is 1 m, the upper limit of the distance range corresponding to the first threshold range is 1 m, the lower limit of the distance range corresponding to the first threshold range is greater than 0.5 m, the upper limit of the distance range corresponding to the second threshold range is 0.5 m, and the lower limit of the distance range corresponding to the second threshold range is greater than or equal to 0.

In this case, in a case where the target distance B of the target object 1000 is 1 m, since the target distance B of the target object 1000 is within the distance range corresponding to the first threshold range, the main board 30 may determine that the threshold range where the target position A is located is the first threshold range. In this way, the first threshold marking line 821 is the target threshold marking line, the first threshold marking line 821 is the solid line, and the second threshold marking line 822 is the dotted line.

In some embodiments of the present disclosure, when the main board 30 controls the display board 40 to generate the second image 802, the main board 30 may control the display board 40 to generate the first information 8021 and the second information 8022 according to the target position A of the target object 1000, so as to obtain the second image 802.

In addition, the main board 30 may arrange a display priority of the second image 802 to the first level and arrange a display priority of the first image 801 to the second level.

The display priority refers to priority levels corresponding to different images when different images are being displayed. An image whose display priority is the first level may be on an image whose display priority is the second level. For example, the second image 802 is superimposed and displayed on the first image 801, so as to prioritize the display of the second image 802.

In some embodiments, a display position of the second image 802 on the first image 801 may be preset. When the second image 802 is displayed on the projection screen 70, the main board 30 may display the second image 802 at the corresponding position on the projection screen 70 according to the preset display position of the second image 802 on the first image 801. The display position refers to a position of the second image 802 relative to the first image 801.

Here, the outer contour of the second image 802 may be quadrilateral (e.g., a rectangle), and the display position includes positions of four vertexes of the outer contour of the second image 802 on the first image 801. Alternatively, the display position includes a position of a vertex of the outer contour of the second image 802 (e.g., the first vertex M1 in FIG. 17) on the first image 801 and a resolution of the second image 802. For example, the first vertex M1 refers to the upper left vertex of the rectangle.

A resolution of the projected image 80 is the same as a resolution of the projection screen 70, and the resolutions of the projected image 80 and the projection screen 70 correspond to the number of the micromirrors included by the light valve 50 in the laser projection apparatus 1. Therefore, one micromirror in the light valve 50 corresponds to one pixel in the projected image 80. In this way, the display board 40 may determine the micromirrors corresponding to all pixels in the second image 802 according to the position of a vertex of the second image 802 on the first image 801 and the resolution of the second image 802 and control the corresponding micromirrors to swing according to the pixels in the second image 802, thereby displaying the second image 802 at the corresponding position on the projection screen 70.

For example, as shown in FIG. 17, a second vertex M2 (e.g., the lower right vertex) of the second image 802 overlaps a target vertex N (e.g., the lower right vertex) of the projected image 80, so that the display position of the second vertex M2 of the second image 802 on the projection screen 70 overlaps the lower right vertex of the projection screen 70. In this case, if the position of the first vertex M1 of the second image 802 on the first image 801 and the resolution of the second image 802 are determined, the position of the entire second image 802 on the projection screen 70 may be determined.

Figure 19:
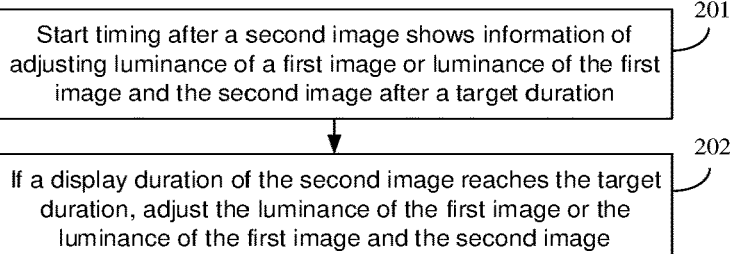
FIG. 19 is yet another flow chart of steps performed by a laser projection apparatus, in accordance with some embodiments.

FIG. 19 is yet another flow chart of steps performed by a laser projection apparatus, in accordance with some embodiments.

In some embodiments, the first information 8021 in the second image 802 is further configured to indicate to adjust the luminance of the first image 801 or adjust the luminance of the first image 801 and the second image 802 after the target duration. For example, as shown in FIG. 17, the first information 8021 includes "A distance between you and the laser projection apparatus is 0.5 m. To protect your eyes, the projection screen will be turned off after 5 seconds."

In this case, as shown in FIG. 19, the laser projection apparatus 1 is further configured to perform step 201 and step 202 (S201 and S202).

In step 201, timing starts after the second image 802 shows information of adjusting the luminance of the first image 801 or the luminance of the first image 801 and the second image 802 after the target duration.

The laser projection apparatus 1 may include a timer, and the timer is configured to time the display duration of the second image 802. The timer may be implemented by hardware or software.

In step 202, if the display duration of the second image 802 reaches the target duration, the luminance of the first image 801 or the luminance of the first image 801 and: the second image 802 is adjusted.

During the display duration of the second image 802 reaching the target duration, the second image 802 is updated in real time.

FIG. 20 is yet another flow chart of steps performed by a laser projection apparatus, in accordance with some embodiments.

In some embodiments, as shown in FIG. 20, the step 202 includes step 2020 (S2020).

In step 2020, during the display duration of the second image 802 reaching the target duration, the target duration shown in the first information 8021 is updated in real time according to a timing duration.

For example, in a case where the target duration is 5 seconds, the timer starts timing from a moment when the first information 8021 displayed on the projection screen 70 includes "A distance between you and the laser projection apparatus is 0.5 m. To protect your eyes, the projection screen will be turned off after 5 seconds." If the timing duration is 1 second, the updated second image 802 is displayed on the projection screen 70, and the first information 8021 of the updated second image 802 includes "A distance between you and the laser projection apparatus is 0.5 m. To protect your eyes, the projection screen will be turned off after 4 seconds." The main board 30 controls the display board 40 to adjust the luminance of the first image 801 or adjust the luminance of the first image 801 and the second image 802 until the timing duration reaches 5 seconds.

In this way, during the display duration of the second image 802 reaching the target duration, the first information 8021 may show a change of the countdown of the target duration. For example, the first information 8021 shows 5 seconds, 4 seconds, 3 seconds, 2 seconds, and 1 second in sequence as the timing duration increases, thereby performing a countdown to remind the user.

It will be noted that, it is possible to adjust current control signal to adjust the driving current provided by the laser source driving assembly 90 to the laser source 91, so as to adjust the luminance of the first image 801, thereby making the luminance of the first image 801 decrease, increase, or remain unchanged. Here, in a case where the second image 802 is displayed, adjusting the luminance of the laser source 91 may not only change the luminance of the first image 801, but also correspondingly change the luminance of the second image 802.

Moreover, adjusting the luminance of the image adjusts the perceived luminance of the image when the image is displayed without changing the corresponding audio content of the image.

In addition, since the projection screen 70 used by the laser projection apparatus 1 is passive, turning off the projection screen 70 refers to turning off the projection beams projected onto the projection screen 70. That is to say, the projected image 80 is turned off. It is possible to control the laser source 91 to stop emitting the illumination beams. Alternatively, it is possible to display a black projected image 80 to turn off the projection screen 70. Here, it is usually possible to prevent the laser source 91 from emitting the illumination beams by stopping supplying the driving current to the laser source 91, thereby stopping the output of the projection beams.

In some embodiments, after the step 103, the laser projection apparatus 1 is further configured to superimpose the second image 802 on the first image 801, control the second image 802 to show that the first image 801 is adjusted after the target duration, and adjust at least one of the image content or the audio content corresponding to the projected image 80.

In a case where the second image 802 is superimposed on the first image 801, the second image 802 may show that the first image 801 is adjusted after the target duration, and the control assembly 41 (e.g., the main board 30) adjusts at least one of the image content or the audio content corresponding to the projected image 80. For example, when the second image 802 shows that the first image 801 is adjusted after the target duration, the control assembly 41 adjusts the luminance of the first image 801 or the luminance of the first image 801 and the second image 802. In this time, the playing state of the audio content corresponding to projected image 80 remains unchanged.

For example, after the second image 802 is displayed, the second image 802 shows a countdown animation (e.g., counting down from 5 seconds), and the control assembly 41 controls the darkening of the projected image 80 and the sound corresponding to the projected image 80 to remain unchanged.

In some embodiments, after adjusting at least one of the image content or the audio content corresponding to the projected image 80, the laser projection apparatus 1 is further configured to receive the detecting signal reflected by the target object 1000 at the second moment; if the target position A of the target object 1000 at the second moment is within threshold range and the display duration of the second image 802 is less than the target duration, update the second image 802; if the target position A of the target object 1000 at the second moment is within threshold range and the display duration of the second image 802 reaches the target duration, cancel the display of the projected image 80; if the target position A of the target object 1000 at the second moment is outside threshold range, cancel the display of the second image 802.

If it is determined that the target position A of the target object 1000 is within at least one threshold range according to the detecting signal received by the detecting device 20 at the second moment, and the display duration of the second image 802 is less than the target duration, the control assembly 41 updates the second image 802. For example, the main board 30 updates the countdown image in the second image 802.

If it is determined that the target position A of the target object 1000 is within at least one threshold range according to the detecting signal received by the detecting device 20 at the second moment, and the display duration of the second image 802 reaches the target duration, the control assembly 41 (e.g., the main board 30) cancels the display of the projected image 80.

If it is determined that the target position A of the target object 1000 is outside at least one threshold range according to the detecting signal received by the detecting device 20 at the second moment, the control assembly 41 (e.g., the main board 30) cancels the display of the second image 802. In this time, there is no need for the display duration of the second image 802 to reach the target duration.

It will be noted that the step numbers are only for the convenience of describing some embodiments of the present disclosure and cannot be understood as limiting the order of the steps. The execution order of the steps may be determined according to actual demands, and the execution order of the steps is not limited to the order of the steps in some embodiments of the present disclosure, and the steps may also be deleted according to the situation. For example, the step 109 or the step 110 may be deleted. Alternatively, the step 201 or the step 202 may be deleted. Alternatively, at least one of the step 105 to the step 110 may be deleted according to the situation.

In some embodiments of the present disclosure, the step 101 to the step 110, the step 201, the step 202, and the step 2020 may be performed by the main board 30. Alternatively, the step 101, the step 102, and the step 105 may be performed by the detecting device 20, and the step 103, the step 104, the step 106 to the step 110, the step 201, the step 202, and the step 2020 may be performed by the main board 30, and the present disclosure is not limited thereto.

In the laser projection apparatus 1 provided in some embodiments of the present disclosure, in a case where the main board 30 determines that the target object 1000 is within the threshold range, it is possible to display the second image 802 on the projection screen 70, so as to show the distance between the target object 1000 and laser projection apparatus 1, as well as the relative position between the target object 1000 and laser projection apparatus 1. In addition, the main board 30 may update the second image 802 in time when the target position A changes, so that the relative position between the first sub-image 823 and the second sub-image 824 in the second information 8022 may be changed with the target position A of the target object 1000.

Moreover, by providing the second image 802 including the first information 8021 and the second information 8022, it is possible to directly show the relative position between the target object 1000 and the laser projection apparatus 1, so as to improve the flexibility of prompting the relative position between the target object 1000 and the laser projection apparatus 1. In addition, the user may keep away from the projection screen 70 in time according to the prompt of the second image 802, so as to avoid damage to the eyes caused by the user being too close to the projected image 80.

Some embodiments of the present disclosure further provide an operating method of a laser projection apparatus, and the method is applied to the above laser projection apparatus 1. The laser projection apparatus 1 includes the detecting device 20, the main board 30, the display board 40, the light valve 50, the projection lens 60, and the projection screen 70.

Figure 21:
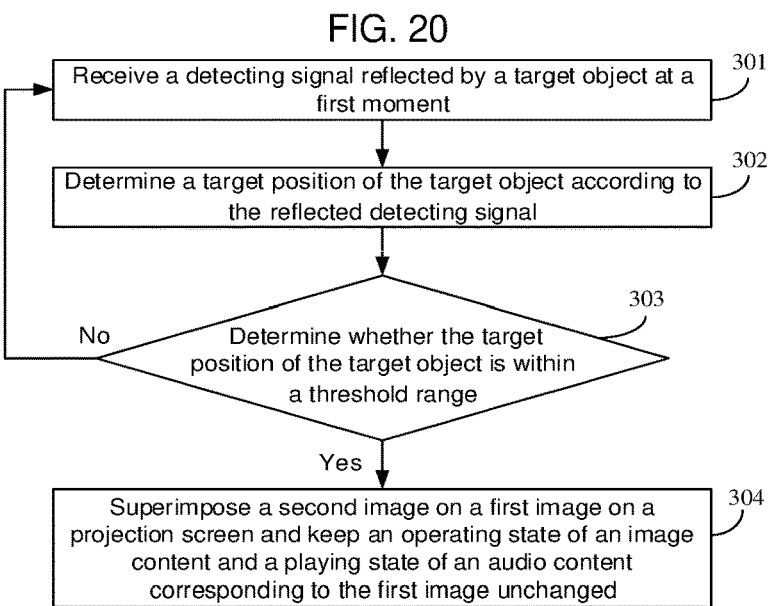
FIG. 21 is a flow chart of an operating method of a laser projection apparatus, in accordance with some embodiments.

FIG. 21 is a flow chart of an operating method of a laser projection apparatus, in accordance with some embodiments.

In some embodiments, as shown in FIG. 21, the method includes step 301 to step 304 (S301 to S304).

In step 301, a detecting signal reflected by a target object 1000 at a first moment is received.

For example, the detecting device 20 in the laser projection apparatus 1 sends out the detecting signal in real time and receives the detecting signal reflected by the target object 1000 in real time.

In step 302, a target position A of the target object 1000 is determined according to the reflected detecting signal.

For example, the detecting device 20 or the main board 30 in the laser projection apparatus 1 determines the target position A of the target object 1000 according to the detecting signal sent out by the detecting device 20 and the detecting signal reflected by the target object 1000 at the first moment.

The target position A may include a target distance B. Alternatively, the target position A may also include a target distance B and a position angle β. The target distance B is a distance between the target object 1000 and the laser projection apparatus 1 (e.g., the detecting device 20). The position angle β is an angle of the target object 1000 relative to the laser projection apparatus 1 (e.g., the detecting device 20). Here, the target position A of the target object 1000 at the first moment may be referred to as a first target position. The target distance B included by the first target position may be referred to as a first target distance. The position angle β included by the first target position may be referred to as a first position angle.

The angles that the detecting device 20 may detect are different from each other on different planes, and the target object 1000 has a certain height. Therefore, the position angle β included by the target position A of the target object 1000 corresponds to different projected angles on different planes. The projected angle may refer to a relative angle between the detecting device 20 and an orthogonal projection of the target object 1000 on a two-dimensional plane where the detecting device 20 is located. Here, the projected angle of the position angle β on the first plane may be referred to as a first position sub-angle β11, and the projected angle of the position angle β on the second plane may be referred to as a second position sub-angle β12.

In step 303, it is determined whether the target position A of the target object 1000 is within a threshold range. If so, the step 304 is performed; if not, the step 301 is performed.

For example, after the detecting device 20 or the main board 30 determines the target position A of the target object 1000, the main board 30 determines whether the target position A of the target object 1000 is within the threshold range.

The threshold range is a preset threshold, and the threshold range includes at least one of a distance range or an angle range. One threshold range or a plurality of different threshold ranges may be preset, and different threshold ranges include different distance ranges and different angle ranges. The distance range corresponds to the target distance B, and the angle range corresponds to the position angle β.

The position angle β includes the first position sub-angle 611 and the second position sub-angle β12. Therefore, in a case where the threshold range includes the angle range, the angle range includes a first angle range and a second angle range. The first angle range corresponds to angles (e.g., the first position sub-angle β11) in the first plane. The second angle range corresponds to angles (e.g., the second position sub-angle β12) in the second plane.

In some embodiments, the angle corresponding to the first angle range is less than or equal to the first angle α1, and the angle corresponding to the second angle range is less than or equal to the second angle α2.

In some embodiments, if the first position sub-angle β11 of the position angle β is within the first angle range or the second position sub-angle β12 of the position angle β is within the second angle range, the laser projection apparatus 1 (e.g., the main board 30) may determine that the target object 1000 is within the threshold range.

In some embodiments, if the target distance B of the target object 1000 is less than or equal to a distance threshold D, the main board 30 may determine that the target position A of the target object 1000 is within the threshold range. For example, the distance threshold D is 1 m. Here, the distance threshold D is the maximum distance that can be displayed on a prompt image (e.g., the second image) on the projection screen 70. For example, the distance threshold D is the maximum value among upper limits of the distance ranges included by the plurality of threshold ranges. If the target distance B of the target object 1000 is greater than the distance threshold D, there is no need for the main board 30 to control the display board 40 to display the prompt image.

In step 304, a second image 802 is superimposed on a first image 801 on the projection screen 70, and an operating state of an image content and a playing state of an audio content corresponding to the first image 801 remain unchanged.

For example, if the main board 30 in the laser projection apparatus 1 determines that the target position A of the target object 1000 is within the threshold range, the main board 30 may control the display board 40, so as to superimpose the second image 802 on the first image 801 on the projection screen 70 and keep the operating state of the image content and the playing state of the audio content corresponding to the first image 801 unchanged. For example, the main board 30 controls the display board 40, so as to make the first image 801 continue to show the main content of the projected image 80 and controls a loudspeaker in the laser projection apparatus 1 to continue to play the sound corresponding to the first image 801.

As shown in FIG. 10, the projected image 80 is a display image formed by superimposing the first image 801 and the second image 802. In a case where the second image 802 does not need to be displayed, the projected image 80 only includes the first image 801. That is to say, the projected image 80 may include the first image 801 and the second image 802. Alternatively, the projected image 80 may include the first image 801.

It will be noted that, the first image 801 occupies most of a region of the projection screen 70, and the first image 801 is a main image displayed by the laser projection apparatus 1 on the projection screen 70, so as to show the main content of the projected image 80. The second image 802 occupies a small region of the projection screen 70, and the second image 802 is a prompt image used to remind the user to stay away from the laser projection apparatus 1. For example, the second image 802 shows a relative position relationship between the target object 1000 and the laser projection apparatus 1. Alternatively, the second image 802 shows a change of a target duration, and the target duration is used to remind the user of a display mode of the laser projection apparatus 1 after the target duration ends, such as turning off the projected image 80.

The second image 802 may include at least one of first information 8021 or second information 8022. The first information 8021 includes text, so as to show the target position A of the target object 1000 through a text. For example, the first information 8021 is "A distance between you and the laser projection apparatus is 1 m, please stay away from the laser projection apparatus." The second information 8022 includes image, the image may be displayed in a UI animation manner. In some embodiments, the second image 802 shows a change of the relative position between the target object 1000 and the laser projection apparatus 1 through images or a change of the target duration through images. For example, the second information 8022 shows a countdown image.

Of course, the operating method in some embodiments of the present disclosure is not limited thereto.

FIG. 22 is another flow chart of an operating method of a laser projection apparatus, in accordance with some embodiments.

In some embodiments, as shown in FIG. 22, after the step 304, the method further includes steps 305 to 310 (e.g., S305 to S310).

In step 305, a detecting signal reflected by the target object 1000 at a second moment is received.

For example, the detecting device 20 in the laser projection apparatus 1 receives the detecting signal reflected by the target object 1000 at the second moment. The second moment is a moment after the first moment.

In step 306, it is determined whether the target position A of the target object 1000 changes according to the detecting signal reflected by the target object 1000 at the second moment. If so, the step 107 is performed; if not, the step 104 is performed.

For example, the detecting device 20 or the main board 30 determines the target position A of the target object 1000 at the second moment according to the detecting signal reflected by the target object 1000 at the second moment. Here, the target position A of the target object 1000 at the second moment may be referred to as a second target position. If the second target position is the same as the first target position, the main board 30 determines that the target position A of the target object 1000 remains unchanged. If the first target position is different from the second target position, the main board 30 determines that the target position A of the target object 1000 has changed.

It will be noted that the target distance B included by the second target position may be referred to as a second target distance. The position angle β included by the second target position may be referred to as a second position angle.

In some embodiments, the main board 30 may determine whether the target position A of the target object 1000 changes according to at least one of the target distance B or the position angle β of the target object 1000.

For example, in a case where the target position A of the target object 1000 includes the target distance B and the position angle β, if the first target distance of the target object 1000 is different from the second target distance of the target object 1000 or the first position angle of the target object 1000 is different from the second position angle of the target object 1000, the main board 30 determines that the target position A of the target object 1000 has changed. If the first target distance of the target object 1000 is the same as the second target distance of the target object 1000 and the first position angle of the target object 1000 is the same as the second position angle of the target object 1000, the main board 30 determines that the target position A of the target object 1000 remains unchanged.

If the first target distance and the second target distance of the target object 1000 are different from each other, the main board 30 determines that the target distance B of the target object 1000 has changed. If the first target distance and the second target distance of the target object 1000 are same, the main board 30 determines that the target distance B of the target object 1000 remains unchanged.

If the first position angle and the second position angle of the target object 1000 are different from each other, the main board 30 determines that the position angle β of the target object 1000 has changed. If the first position angle and the second position angle of the target object 1000 are same, the main board 30 determines that the position angle β of the target object 1000 remains unchanged.

In step 307, it is determined whether the target position A of the target object 1000 at the second moment is within the threshold range. If so, the step 308 is performed; if not, the step 309 is performed.

For example, the main board 30 in the laser projection apparatus 1 determines whether the target position A (e.g., the second target position) of the target object 1000 at the second moment is within the threshold range.

In step 308, the second image 802 is updated according to the changed target position A.

For example, in a case where the main board 30 determines that the target position A of the target object 1000 has changed, and the changed target position A (e.g., the second target position) is within the threshold range, the main board 30 updates the second image 802 according to the changed target position A.

For example, as shown in FIGS. 9 and 12, in a case where the distance threshold D is 1 m, if the first target distance is 1 m and the second target distance is 0.5 m, the first target distance and the second target distance are different from each other, the main board 30 may determine that the target position A of the target object 1000 has changed. Moreover, since the second target distance is less than the distance threshold D (0.5 m<1 m), the changed target distance B is still within the distance range of the threshold range. In this case, the main board 30 may determine that the changed target position A is within the threshold range, so that the main board 30 may update the second image 802.

For example, the main board 30 updates the first information 8021 that "A distance between you and the laser projection apparatus is 1 m, please stay away from the laser projection apparatus" in FIG. 10 to the first information 8021 that "A distance between you and the laser projection apparatus is 0.5 m, please stay away from the laser projection apparatus" in FIG. 13. Meanwhile, the main board 30 updates the second information 8022 in FIG. 10 to the second information 8022 in FIG. 13.

In step 309, the display of the second image 802 is canceled.

In a case where the target position A of the target object 1000 has changed, and the changed target position A is outside the threshold range, the main board 30 determines that the target distance B of the target object 1000 is large, and the laser beams emitted by the laser projection apparatus 1 will not cause damage to the eyes, so that the main board 30 may cancel the display of the second image 802. Alternatively, in a case where the changed target position A is outside the threshold range, after a display duration of the second image 802 reaches the target duration, the main board 30 may cancel sending the image signal corresponding to the second image 802 to the display board 40.

In step 310, after the display duration of the second image 802 reaches the target duration, luminance of the first image 801 is adjusted or luminance of the first image 801 and the second image 802 is adjusted.

For example, after the display duration of the second image 802 reaches the target duration, the main board 30 may adjust the luminance of the first image 801 or the main board 30 may adjust the luminance of the first image 801 and the second image 802.

It will be noted that, after the step 304, the main board 30 may also directly perform the step 309 and the step 310.

In some embodiments, a plurality of luminance thresholds are preset in the laser projection apparatus 1, and the plurality of luminance thresholds may correspond to the plurality of threshold ranges respectively.

FIG. 23 is yet another flow chart of an operating method of a laser projection apparatus, in accordance with some embodiments.

In some embodiments, as shown in FIG. 23, the step 310 includes step 3101 (S3101).

In step 3101, the luminance of the first image 801 or the luminance of the first image 801 and the second image 802 is adjusted to the corresponding luminance threshold according to the threshold range where the target position A of the target object 1000 is located.

The main board 30 may adjust the luminance of the first image 801 or the luminance of the first image 801 and the second image 802 to the corresponding luminance threshold by controlling the display board 40 according to the threshold range where the target position A of the target object 1000 is located.

For example, in a case where the plurality of threshold ranges include a first threshold range and a second threshold range, the plurality of luminance thresholds may include first luminance and second luminance, where the first luminance corresponds to the first threshold range, and the second luminance corresponds to the second threshold range. The first luminance is greater than the second luminance. The lower limit of the distance range corresponding to the first threshold range is greater than the upper limit of the distance range corresponding to the second threshold range.

In this case, if the target position A of the target object 1000 is within the first threshold range, the main board 30 may adjust the luminance of the first image 801 or the luminance of the first image 801 and the second image 802 to the first luminance. If the target position A of the target object 1000 is within the second threshold range, the main board 30 may adjust the luminance of the first image 801 or the luminance of the first image 801 and the second image 802 to the second luminance. Here, the first luminance may be 50% of original luminance, and the second luminance is 0. The original luminance may be the luminance of the first image 801 when the projected image 80 is normally displayed on the projection screen 70.

In this way, if the target position A of the target object 1000 is within the first threshold range, the luminance of the projected image 80 has little impact on the eyes. In this case, the main board 30 may reduce the luminance of the first image 801 or the luminance of the first image 801 and the second image 802 to half of the original luminance, so as to protect the eyes while allowing the users to view the projected image 80 normally.

If the target position A of the target object 1000 is within the second threshold range, the luminance of the projected image 80 has a great impact on the eyes. In this case, the main board 30 may reduce the luminance of the first image 801 or the luminance of the first image 801 and the second image 802 to 0, so as to avoid damage to the eyes due to the high luminance of the projected image 80.

In some embodiments, the corresponding relationship between the plurality of threshold ranges and the plurality of luminance thresholds may be preset. In this way, after the display duration of the second image 802 reaches the target duration, the main board 30 may determine the luminance threshold corresponding to the threshold range where the target position A of the target object 1000 is located according to the corresponding relationship between the plurality of threshold ranges and the plurality of luminance thresholds.

The main board 30 may determine the luminance threshold corresponding to the threshold range where the target position A of the target object 1000 is located according to the target position A of the target object 1000, so as to dynamically adjust the luminance of the first image 801 or the luminance of the first image 801 and the second image 802, so that flexible protection for the eyes is achieved. For example, after the main board 30 adjusts the luminance of the first image 801 or the luminance of the first image 801 and the second image 802 to 0, if the main board 30 determines that the target position A of the target object 1000 is within the first threshold range, the main board 30 may restore the luminance of the first image 801 or the luminance of the first image 801 and the second image 802 to 50% of the original luminance.

After the main board 30 determines that the target distance B of the target object 1000 is greater than the distance threshold D, the main board 30 may restore the luminance of the first image 801 or the luminance of the first image 801 and the second image 802 to the original luminance, without displaying the second image 802 according to the target distance B of the target object 1000.

In some embodiments, the threshold range corresponds to the target duration, and a corresponding relationship between the threshold range and the target duration may be preset. For example, in a case where the threshold range includes the plurality of threshold ranges, a plurality of target durations are preset, and the plurality of threshold ranges correspond to the plurality of target durations respectively.

FIG. 24 is yet another flow chart of an operating method of a laser projection apparatus, in accordance with some embodiments.

In this case, after the main board 30 determines the threshold range where the target position A of the target object 1000 is located, as shown in FIG. 24, the method further includes step 401 (S401).

In step 401, the target duration is determined according to the threshold range where the target position A of the target object 1000 is located.

For example, the main board 30 in the laser projection apparatus 1 determines the target duration corresponding to the threshold range where the target position A of the target object 1000 is located according to the corresponding relationship between the threshold range and the target duration.

It will be noted that the target duration is positively correlated with the upper limit of the distance range of the threshold range. That is to say, the less the upper limit of the distance range of the threshold range, the less the target duration. The greater the upper limit of the distance range of the threshold range, the greater the target duration.

In some embodiments, as shown in FIGS. 16 and 17, the second information 8022 includes a first sub-image 823, a second sub-image 824, and a distance marking line 825. The first sub-image 823 indicates the target object 1000. The second sub-image 824 indicates the laser projection apparatus 1. The distance marking line 825 is located between the first sub-image 823 and the second sub-image 824 and is configured to mark the target distance B between the target object 1000 and the laser projection apparatus 1. The distance marking line 825 may directly show the target distance B, which is conducive to showing the change of the target distance B, so as to effectively remind the user.

In some embodiments, as shown in FIGS. 16 and 17, the second information 8022 further includes distance information 826, and the distance information 826 is configured to show a value of the target distance B of the target object 1000. The distance information 826 is proximate to the distance marking line 825. For example, as shown in FIGS.

16 and 17, the distance information 826 is "B=0.5 m" and is located above the distance marking line 825.

In some embodiments, during the process of generating the second image 802 according to the target position A of the target object 1000, the main board 30 may determine a display distance L1 between the first sub-image 823 and the second sub-image 824 in the second information 802 according to the distance threshold D, a display distance threshold L0, and the target distance B of the target object 1000.

The display distance L1 may be calculated according to the formula (1).

In some embodiments, if the main board 30 determines that the target distance B of the target object 1000 decreases, the main board 30 may reduce the display distance L1 between an image (e.g., the first sub-image 823) of the target object 1000 and an image (e.g., the second sub-image 824) of the laser projection apparatus 1 in the second information 8022. If the main board 30 determines that the target distance B of the target object 1000 increases, the main board 30 may increase the display distance L1 between the image of the target object 1000 and the image of the laser projection apparatus 1 in the second information 8022.

For example, after the main board 30 determines that the target position A of the target object 1000 has changed, if the main board 30 determines that the second target position is closer to the laser projection apparatus 1 than the first target position (that is, the second target distance is less than the first target distance), the main board 30 determines that the target distance B of the target object 1000 decreases and the target object 1000 moves toward the laser projection apparatus 1. In this case, the main board 30 may reduce the display distance L1 between the image of the target object 1000 and the image of the laser projection apparatus 1 in the second information 8022 and update the first information 8021.

If the main board 30 determines that the second target position is farther away from the laser projection apparatus 1 than the first target position (that is, the second target distance is greater than the first target distance), the main board 30 determines that the target distance B of the target object 1000 increases and the target object 1000 moves in a direction away from the laser projection apparatus 1. In this case, the main board 30 may increase the display distance L1 between the image of the target object 1000 and the image of the laser projection apparatus 1 in the second information 8022 and update the first information 8021.

In some embodiments, in a case where the plurality of threshold ranges are preset, the second information 8022 may further include a plurality of threshold marking lines. The plurality of threshold marking lines correspond to the plurality of threshold ranges respectively. The plurality of threshold marking lines includes a target threshold marking line, and the target threshold marking line is the threshold marking line corresponding to the threshold range where the target position A of the target object 1000 is located. Among the plurality of threshold marking lines, a display effect of the target threshold marking line is different from that of other threshold marking lines. The display effect may refer to a line type, color, or thickness of the threshold marking line. Of course, the present disclosure is not limited thereto.

For example, the color of the target threshold marking line is a first color, the colors of other threshold marking lines among the plurality of threshold marking lines each are a second color, and the first color is different from the second color. Alternatively, the display effect of the target threshold marking line is flickering display, and the display effect of other threshold marking lines among the plurality of threshold marking lines is non-flicker display. Alternatively, the target threshold marking line is a solid line, and the other threshold marking lines among the plurality of threshold marking lines each are a dotted line.

In some embodiments, in a case where the plurality of threshold ranges include the first threshold range and the second threshold range, the second information 8022 includes two threshold marking lines. For example, as shown in FIG. 18, the second information 8022 includes a first threshold marking line 821 and a second threshold marking line 822. The first threshold marking line 821 corresponds to the first threshold range, and the second threshold marking line 822 corresponds to the second threshold range. The upper limit of the distance range corresponding to the first threshold range is less than or equal to the distance threshold D. The lower limit of the distance range corresponding to the first threshold range is greater than the upper limit of the distance range corresponding to the second threshold range.

For example, in a case where the distance threshold D is 1 m, the upper limit of the distance range corresponding to the first threshold range is 1 m, the lower limit of the distance range corresponding to the first threshold range is greater than 0.5 m, the upper limit of the distance range corresponding to the second threshold range is 0.5 m, and the lower limit of the distance range corresponding to the second threshold range is greater than or equal to 0.

In this case, in a case where the target distance B of the target object 1000 is 1 m, since the target distance B of the target object 1000 is within the distance range corresponding to the first threshold range, the main board 30 may determine that the threshold range where the target position A is located is the first threshold range. In this way, the first threshold marking line 821 is the target threshold marking line, the first threshold marking line 821 is the solid line, and the second threshold marking line 822 is the dotted line.

In some embodiments of the present disclosure, when the main board 30 controls the display board 40 to generate the second image 802, the main board 30 may control the display board 40 to generate the first information 8021 and the second information 8022 according to the target position A of the target object 1000, so as to obtain the second image 802.

In addition, the main board 30 may arrange a display priority of the second image 802 to the first level and arrange a display priority of the first image 801 to the second level. The display priority refers to priority levels corresponding to different images when different images are being displayed. An image whose display priority is the first level may be on an image whose display priority is the second level. For example, the second image 802 is superimposed and displayed on the first image 801, so as to prioritize the display of the second image 802.

In some embodiments, a display position of the second image 802 on the first image 801 may be preset. When the second image 802 is displayed on the projection screen 70, the main board 30 may display the second image 802 at the corresponding position on the projection screen 70 according to the preset display position of the second image 802 on the first image 801. The display position refers to a position of the second image 802 relative to the first image 801.

Here, the outer contour of the second image 802 may be quadrilateral (e.g., a rectangle), and the display position includes positions of four vertexes of the outer contour of the second image 802 on the first image 801. Alternatively, the display position includes a position of a vertex of the second image 802 (e.g., the first vertex M1 in FIG. 17) on the first image 801 and a resolution of the second image 802. For example, the first vertex M1 refers to the upper left vertex of the rectangle.

A resolution of the projected image 80 is the same as a resolution of the projection screen 70, and the resolutions of the projected image 80 and the projection screen 70 correspond to the number of the micromirrors included by the light valve 50 in the laser projection apparatus 1. Therefore, one micromirror in the light valve 50 corresponds to one pixel in the projected image 80. In this way, the display board 40 may determine the micromirrors corresponding to all pixels in the second image 802 according to the position of a vertex of the second image 802 on the first image 801 and the resolution of the second image 802 and control the corresponding micromirrors to swing according to the pixels in the second image 802, thereby displaying the second image 802 at the corresponding position on the projection screen 70.

For example, as shown in FIG. 17, a second vertex M2 (e.g., the lower right vertex) of the second image 802 overlaps a target vertex N (e.g., the lower right vertex) of the projected image 80, so that the display position of the second vertex M2 of the second image 802 on the projection screen 70 overlaps the lower right vertex of the projection screen 70. In this case, if the position of the first vertex M1 of the second image 802 on the first image 801 and the resolution of the second image 802 are determined, the position of the entire second image 802 on the projection screen 70 may be determined.

In some embodiments, the first information 8021 in the second image 802 is further configured to indicate to adjust the luminance of the first image 801 or adjust the luminance of the first image 801 and the second image 802 after the target duration. For example, as shown in FIG. 17, the first information 8021 includes "A distance between you and the laser projection apparatus is 0.5 m. To protect your eyes, the projection screen will be turned off after 5 seconds."

FIG. 25 is yet another flow chart of an operating method of a laser projection apparatus, in accordance with some embodiments.

In this case, as shown in FIG. 25, the method further includes step 501 and step 502 (S501 and S502).

In step 501, timing starts after the second image 802 shows information of adjusting the luminance of the first image 801 or the luminance of the first image 801 and the second image 802 after the target duration.

It will be noted that the laser projection apparatus 1 may include a timer, and the timer is configured to time the display duration of the second image 802. The timer may be implemented by hardware or software.

In step 502, if the display duration of the second image 802 reaches the target duration, the luminance of the first image 801 or the luminance of the first image 801 and the second image 802 is adjusted.

It will be noted that, during the display duration of the second image 802 reaching the target duration, the second image 802 is updated in real time.

FIG. 26 is yet another flow chart of an operating method of a laser projection apparatus, in accordance with some embodiments.

In some embodiments, as shown in FIG. 26, the step 502 includes step S020 (S5020).

In step S020, during the display duration of the second image 802 reaching the target duration, the target duration shown in the first information 8021 is updated in real time according to a timing duration.

For example, in a case where the target duration is 5 seconds, the timer starts timing from a moment when the first information 8021 displayed on the projection screen 70 includes "A distance between you and the laser projection apparatus is 0.5 m. To protect your eyes, the projection screen will be turned off after 5 seconds." If the timing duration is 1 second, the updated second image 802 is displayed on the projection screen 70, and the first information 8021 of the updated second image 802 includes "A distance between you and the laser projection apparatus is 0.5 m. To protect your eyes, the projection screen will be turned off after 4 seconds." The main board 30 controls the display board 40 to adjust the luminance of the first image 801 or adjust the luminance of the first image 801 and the second image 802 until the timing duration reaches 5 seconds.

In this way, during the display duration of the second image 802 reaching the target duration, the first information 8021 may show a change of the countdown of the target duration. For example, the first information 8021 shows 5 seconds, 4 seconds, 3 seconds, 2 seconds, and 1 second in sequence as the timing duration increases, thereby performing a countdown to remind the user.

In some embodiments, after the step 303, the method further includes: superimposing the second image 802 on the first image 801, controlling the second image 802 to show that the first image 801 is adjusted after the target duration, and adjusting at least one of the image content or the audio content corresponding to the projected image 80.

In a case where the second image 802 is superimposed on the first image 801, the second image 802 may show that the first image 801 is adjusted after the target duration, and the control assembly 41 (e.g., the main board 30) adjusts at least one of the image content or the audio content corresponding to the projected image 80. For example, when the second image 802 shows that the first image 801 is adjusted after the target duration, the control assembly 41 adjusts the luminance of the first image 801 or the luminance of the first image 801 and the second image 802. In this time, the playing state of the audio content corresponding to projected image 80 remains unchanged.

For example, after the second image 802 is displayed, the second image 802 shows a countdown animation (e.g., counting down from 5 seconds), and the control assembly 41 controls the darkening of the projected image 80, and the sound corresponding to the projected image 80 to remain unchanged.

In some embodiments, after adjusting at least one of the image content or the audio content corresponding to the projected image 80, the method further includes: receiving the detecting signal reflected by the target object 1000 at the second moment; if the target position A of the target object 1000 at the second moment is within threshold range and the display duration of the second image 802 is less than the target duration, updating the second image 802; if the target position A of the target object 1000 at the second moment is within threshold range and the display duration of the second image 802 reaches the target duration, canceling the display of the projected image 80; if the target position A of the target object 1000 at the second moment is outside threshold range, cancel the display of the second image 802.

If it is determined that the target position A of the target object 1000 is within at least one threshold range according to the detecting signal received by the detecting device 20 at the second moment, and the display duration of the second image 802 is less than the target duration, the control assembly 41 updates the second image 802. For example, the main board 30 updates the countdown image in the second image 802.

If it is determined that the target position A of the target object 1000 is within at least one threshold range according to the detecting signal received by the detecting device 20 at the second moment, and the display duration of the second image 802 reaches the target duration, the control assembly 41 (e.g., the main board 30) cancels the display of the projected image 80.

If it is determined that the target position A of the target object 1000 is outside at least one threshold range according to the detecting signal received by the detecting device 20 at the second moment, the control assembly 41 (e.g., the main board 30) cancels the display of the second image 802. In this time, there is no need for the display duration of the second image 802 to reach the target duration.

It will be noted that the above step numbers are only for the convenience of describing some embodiments of the present disclosure and cannot be understood as limiting the order of the steps. The execution order of the steps may be determined according to actual demands, and the execution order of the steps is not limited to the order of the steps in some embodiments of the present disclosure, and the steps may also be deleted according to the actual situation. For example, the step 309 or the step 310 may be deleted. Alternatively, the step 501 or the step 502 may be deleted. Alternatively, at least one of the step 305 to the step 310 may be deleted according to the situation.

In some embodiments of the present disclosure, the step 301 to the step 310, the step 3101, the step 401, the step 501, the step 502, and the step S020 may be performed by the main board 30. Alternatively, the step 301, the step 302, and the step 305 may be performed by the detecting device 20, and the step 303, the step 304, the step 306 to the step 310, the step 3101, the step 401, the step 501, the step 502, and the step S020 may be performed by the main board 30, and the present disclosure is not limited thereto.

In the operating method of the laser projection apparatus provided in some embodiments of the present disclosure, in a case where the main board 30 determines that the target object 1000 is within the threshold range, it is possible to display the second image 802 on the projection screen 70, so as to show the distance between the target object 1000 and laser projection apparatus 1, as well as the relative position between the target object 1000 and laser projection apparatus 1. In addition, the main board 30 may update the second image 802 in time when the target position A changes, so that the relative position between the first sub-image 823 and the second sub-image 824 in the second information 8022 may be changed with the target position A of the target object 1000.

Moreover, by providing the second image 802 including the first information 8021 and the second information 8022, it is possible to directly show the relative position between the target object 1000 and the laser projection apparatus 1, so as to improve the flexibility of prompting the relative position between the target object 1000 and the laser projection apparatus 1. In addition, the user may keep away from the projection screen 70 in time according to the prompt of the second image 802, so as to avoid damage to the eyes caused by the user being too close to the projected image 80.

FIG. 27 is a block diagram of yet another structure of a laser projection apparatus, in accordance with some embodiments.

As shown in FIG. 27, some embodiments of the present disclosure further provide a laser projection apparatus 2. The laser projection apparatus 2 further includes a memory 81 and a processor 82. The memory 81 stores one or more computer programs, and the one or more computer programs include instructions. When the instructions are executed by the processor 82, the processor 82 executes the above operating method of the laser projection apparatus.

Some embodiments of the present disclosure provide a computer-readable storage medium (e.g., a non-transitory computer-readable storage medium), the computer-readable storage medium has stored therein computer program instructions. When the computer program instructions run on a computer, the computer program instructions make the computer execute the operating method of the laser projection apparatus in any one of the above embodiments.

For example, the computer-readable storage medium may include, but is not limited to: a magnetic storage device (e.g., a hard disk, a floppy disk, or a magnetic tape), an optical disk (e.g., a compact disk (CD), or a digital versatile disk (DVD)), a smart card, and a flash memory device (e.g., an erasable programmable read-only memory (EPROM), a card, a stick or a key drive). The various computer-readable storage media described in the present disclosure may represent one or more devices and/or other machine-readable storage media for storing information. The term "machine-readable storage media" may include, but are not limited to, wireless channels and various other media capable of storing, containing, and/or carrying instruction(s) and/or data.

Some embodiments of the present disclosure further provide a computer program product. The computer program product includes computer program instructions. When the computer program instructions are executed by a computer, the computer program instructions make the computer execute the operating method of the laser projection apparatus in any one of the above embodiments.

Some embodiments of the present disclosure further provide a computer program. When the computer program is executed by a computer, the computer program makes the computer execute the operating method of the laser projection apparatus in any one of the above embodiments.

Beneficial effects of the computer-readable storage medium, the computer program product, and the computer program are same as the beneficial effects of the operating method of the laser projection apparatus in some embodiments described above, and details will not be repeated herein.

In the description of the above embodiments, specific features, structures, materials or characteristics may be combined in any one or more embodiments or examples in any suitable manner.

A person skilled in the art will understand that the scope of disclosure in the present disclosure is not limited to specific embodiments discussed above, and may modify and substitute some elements of the embodiments without departing from the spirits of this application. The scope of this application is limited by the appended claims.

What is claimed is:

1. A laser projection apparatus, comprising:
  a housing;
  a detecting device, the detecting device being configured to send a detecting signal and receive the detecting signal reflected by a target object;
  a projection screen configured to receive projection beams, so as to display a projected image; and a control assembly electrically connected to the detecting device, and the control assembly being configured to:
    determine a target position of the target object according to the detecting signal received by the detecting device at a first moment;
    if determining that the target position of the target object is within a threshold range, superimpose a second image on a first image on the projection screen, control the second image to show that the first image is adjusted after a target duration, and adjust at least one of the image content or the audio content corresponding to the projected image;
  wherein the target position is a position of the target object relative to the laser projection apparatus, the projected image is a display image provided by superimposing the first image and the second image, the first image is a main image displayed on the projection screen by the laser projection apparatus, so as to show a main content of the projected image; the second image includes at least one of first information or second information, the first information includes text, and the second information includes image, so that the second information shows a change of a relative position between the target object and the laser projection apparatus through images or a change of the target duration through images.

2. The laser projection apparatus according to claim 1, wherein the control assembly is further configured to:
  if determining that the target position of the target object is within the threshold range, according to the detecting signal received by the detecting device at a second moment, and a display duration of the second image is less than the target duration, update the second image;
  if determining that the target position of the target object is within the threshold range, according to the detecting signal received by the detecting device at the second moment, and the display duration of the second image reaches the target duration, cancel a display of the projected image; and
  if determining that the target position of the target object is outside the threshold range, according to the detecting signal received by the detecting device at the second moment, cancel a display of the second image.

3. The laser projection apparatus according to claim 1, wherein when controlling the second image to show that the first image is adjusted after the target duration, the control assembly 41 is further configured to:
  adjust one of luminance of the first image and luminance of the first image and the second image.

4. The laser projection apparatus according to claim 3, further comprising:
  a laser source configured to emit illumination beams;
  a light valve configured to receive the illumination beams and modulate the illumination beams to the projection beams;
  a projection lens configured to receive the projection beams and project the projection beams onto the projection screen, so as to display the projected image; and
  a laser source driving assembly electrically connected to the laser source and the control assembly, and the laser source driving assembly being configured to adjust the luminance of the illumination beams emitted by the laser source due to control of the control assembly, so as to adjust one of the luminance of the first image and the luminance of the first image and the second image.

5. The laser projection apparatus according to claim 1, wherein the detecting device satisfies one of the following:

the detecting device is located on a side of the housing away from the projection screen; and the detecting device is located on a surface of the housing that intersects with the projection screen.

6. The laser projection apparatus according to claim 1, wherein the control assembly includes:

a main board disposed in the housing and electrically connected to the detecting device; and a display board disposed in the housing and electrically connected to the main board;

wherein the detecting device is further configured to send the received detecting signal to the main board, so that the main board determines the target position of the target object according to the received detecting signal.

7. The laser projection apparatus according to claim 1, wherein the control assembly includes:

a main board disposed in the housing; and a display board disposed in the housing and electrically connected to the main board and the detecting device;

wherein the detecting device is further configured to send the received detecting signal to the main board through the display board, so that the main board determines the target position of the target object according to the received detecting signal.

8. An operating method for a laser projection apparatus, wherein the laser projection apparatus includes a detecting device and a projection screen, the detecting device is configured to send a detecting signal and receive the detecting signal reflected by a target object, and the projection screen is configured to receive projection beams, so as to display a projected image, and the method comprises:

receiving the detecting signal reflected by the target object at a first moment;

determining a target position of the target object according to the reflected detecting signal;

if determining that the target position of the target object is within at least one threshold range, superimposing a second image on a first image on the projection screen, keeping an operating state of an image content and a playing state of an audio content corresponding to the first image unchanged;

wherein the target position is a position of the target object relative to the laser projection apparatus, the projected image is a display image provided by superimposing the first image and the second image, the first image is a main image displayed on the projection screen by the laser projection apparatus, so as to show a main content of the projected image, the second image includes at least one of first information or second information, the first information includes text, and the second information includes image, so that the second information shows a change of a relative position between the target object and the laser projection apparatus through images or a change of at least one target duration through images.

9. The method according to claim 8, further comprising:

receiving the detecting signal reflected by the target object at a second moment;

if determining that the target position of the target object changes, according to the detecting signal received at the second moment, and the changed target position is within the threshold range, updating the second image according to the changed target position; and if determining that the target position of the target object changes, according to the detecting signal received at the second moment, and the changed target position is outside the threshold range, canceling a display of the second image.

10. The method according to claim 9, wherein the target position of the target object satisfies one of the following: the target position includes a target distance, and the target position includes the target distance and a position angle; wherein the target distance is a distance between the target object and the laser projection apparatus, the position angle is an angle of the target object relative to the laser projection apparatus;

the threshold range includes at least one of a distance range or an angle range, the distance range corresponds to the target distance, and the angle range corresponds to the position angle;

the method satisfies one of the following:

when the target position includes the target distance, the determining that the target position of the target object is within the threshold range, includes:

if the target distance is within the distance range, determining that the target position of the target object is within the threshold range; and when the target position includes the target distance and the position angle, the determining that the target position of the target object is within the threshold range, includes:

if the target distance is within the distance range and the position angle is within the angle range, determining that the target position of the target object is within the threshold range.

11. The method according to claim 10, wherein the updating the second image according to the changed target position includes:

if determining that the target distance of the target object decreases, reducing a display distance between an image of the target object and an image of the laser projection apparatus in the second information; and if determining that the target distance of the target object increases, increasing the display distance between the image of the target object and the image of the laser projection apparatus in the second information.

12. The method according to claim 10, wherein the first information is configured to show the target position of the target object through a text, the second information includes:

a first sub-image indicating the target object;

a second sub-image indicating the laser projection apparatus; and a distance marking line located between the first sub-image and the second sub-image, and the distance marking line being configured to mark the target distance between the target object and the laser projection apparatus.

13. The method according to claim 12, further comprising:

determining a display distance between the first sub-image and the second sub-image, according to the target distance of the target object, a distance threshold, and a display distance threshold;

wherein the distance threshold is a maximum value in the threshold range, and the display distance threshold is a maximum display distance between the first sub-image and the second sub-image corresponding to the distance threshold.

14. The method according to claim 8, further comprising:

if the display duration of the second image reaches the target duration, canceling a display of the second image.

15. The method according to claim 8, further comprising:

if a display duration of the second image reaches the target duration, adjusting one of luminance of the first image, and, luminance of the first image and the second image.

16. The method according to claim 15, wherein the at least one threshold range includes a plurality of threshold ranges, a plurality of luminance thresholds are preset in the laser projection apparatus, and the plurality of luminance thresholds correspond to the plurality of threshold ranges respectively, the adjusting one of the luminance of the first image and the luminance of the first image and the second image, including:

adjusting one of the luminance of the first image to the corresponding luminance threshold and the luminance of the first image and the second image to the corresponding luminance threshold, according to the threshold range where the target position of the target object is located.

17. The method according to claim 8, wherein the at least one threshold range includes a plurality of threshold ranges, the at least one target duration includes a plurality of target durations, and the plurality of threshold ranges correspond to the plurality of target durations respectively, the method further comprises:

determining the target duration according to the threshold range where the target position of the target object is located.

18. The method according to claim 8, wherein the first information is configured to indicate to adjust one of luminance of the first image and luminance of the first image and the second image after the target duration; the method further comprises:

starting timing after the second image shows information that one of the luminance of the first image and the luminance of the first image and the second image is adjusted after the target duration; and if a display duration of the second image reaches the target duration, adjusting one of the luminance of the first image and the luminance of the first image and the second image.

19. The method according to claim 8, wherein the at least one threshold range includes a plurality of threshold ranges, the second information includes a plurality of threshold marking lines, the plurality of threshold marking lines correspond to the plurality of threshold ranges respectively, the plurality of threshold marking lines includes a target threshold marking line, the target threshold marking line is a threshold marking line corresponding to the threshold range where the target position of the target object is located, and a display effect of the target threshold marking line is different from display effects of other threshold marking lines in the plurality of threshold marking lines.

20. A non-transitory computer-readable storage medium, wherein the non-transitory computer-readable storage medium stores computer program instructions that, when executed by a computer, make the computer to perform one or more steps in the operating method of the laser projection apparatus according to the claim 8.

* * * * *